(12) United States Patent
Kaneko et al.

(10) Patent No.: US 8,931,958 B2
(45) Date of Patent: Jan. 13, 2015

(54) SYNTHETIC RESIN-MADE THRUST SLIDING BEARING

(75) Inventors: Ryohei Kaneko, Kanagawa (JP);
Yoshiaki Furusawa, Kanagawa (JP);
Masaya Kinjyo, Kanagawa (JP)

(73) Assignee: Oiles Corporation, Tokyo (JP)

( * ) Notice: Subject to any disclaimer, the term of this patent is extended or adjusted under 35 U.S.C. 154(b) by 445 days.

(21) Appl. No.: 13/060,510

(22) PCT Filed: Aug. 25, 2009

(86) PCT No.: PCT/JP2009/004102
§ 371 (c)(1),
(2), (4) Date: Mar. 15, 2011

(87) PCT Pub. No.: WO2010/023882
PCT Pub. Date: Mar. 4, 2010

(65) Prior Publication Data
US 2011/0194793 A1    Aug. 11, 2011

(30) Foreign Application Priority Data

Aug. 26, 2008    (JP) ................................ 2008-217450

(51) Int. Cl.
*F16C 17/04*    (2006.01)
*B60G 15/06*    (2006.01)
(Continued)

(52) U.S. Cl.
CPC ........... *B60G 15/068* (2013.01); *C10M 169/02* (2013.01); *F16C 17/04* (2013.01); *F16C 33/1065* (2013.01); *F16C 33/109* (2013.01); *F16C 33/20* (2013.01); *B60G 2204/418* (2013.01); *B60G 2206/7104* (2013.01); *C10M 2201/0666* (2013.01);
(Continued)

(58) Field of Classification Search
USPC ................................................. 384/420–427
See application file for complete search history.

(56) References Cited

U.S. PATENT DOCUMENTS 4,582,620 A  *  4/1986  Mori et al. ................... 508/208
4,728,450 A        3/1988  Toya et al.
(Continued)

FOREIGN PATENT DOCUMENTS

CN        1392350 A      1/2003
JP      63-101326 U      7/1988
(Continued)

OTHER PUBLICATIONS

Translation of JP2005-008737 obtained Jun. 5, 2013.*
(Continued)

*Primary Examiner* — James Pilkington
(74) *Attorney, Agent, or Firm* — Nixon & Vanderhye P.C.

(57) ABSTRACT

In a synthetic resin-made thrust sliding bearing, a silicone grease whose base oil is a silicone oil, whose coefficient of kinematic viscosity at 25° C. is not less than 100 cSt and not more than 500,000 cSt, and which contains a thickener so as to set its worked penetration to not less than 200 and not more than 400 is interposed at sliding interfaces between, on the one hand, an upper surface of a lower annular flat plate-shaped portion defining a bottom surface of a lower annular recess and a lower surface of an upper annular flat plate-shaped portion and, on the other hand, an upper surface and a lower surface of a thrust bearing piece which are respectively brought into sliding contact with the upper and the lower surface.

22 Claims, 4 Drawing Sheets

(51) Int. Cl.
*C10M 169/02* (2006.01)
*F16C 33/10* (2006.01)
*F16C 33/20* (2006.01)

(52) U.S. Cl.
CPC ............... *C10M 2201/1056* (2013.01); *C10M 2207/1285* (2013.01); *C10M 2213/0626* (2013.01); *C10M 2215/2206* (2013.01); *C10M 2229/0425* (2013.01); *C10N 2230/06* (2013.01); *C10N 2240/02* (2013.01); *C10N 2250/10* (2013.01); *F16C 2326/05* (2013.01)
USPC ....................................................... 384/420

(56) References Cited

U.S. PATENT DOCUMENTS

| | | | |
|---|---|---|---|
| 4,969,752 A | | 11/1990 | Kubota et al. |
| 5,476,326 A | * | 12/1995 | Ueno et al. ............... 384/125 |
| 6,214,774 B1 | * | 4/2001 | Nozaki et al. ............ 508/209 |
| 6,296,393 B1 | * | 10/2001 | Yabe et al. ................ 384/463 |
| 7,053,028 B2 | * | 5/2006 | Kawamura et al. ....... 508/555 |
| 2006/0215944 A1 | | 9/2006 | Watai et al. |
| 2007/0116391 A1 | * | 5/2007 | Watai et al. ............... 384/420 |
| 2007/0237439 A1 | | 10/2007 | Watai et al. |
| 2008/0310780 A1 | | 12/2008 | Watai et al. |

FOREIGN PATENT DOCUMENTS

| | | | |
|---|---|---|---|
| JP | 1-141926 U | | 9/1989 |
| JP | 2-1532 Y2 | | 1/1990 |
| JP | 2-6263 Y2 | | 2/1990 |
| JP | 4-47445 Y2 | | 11/1992 |
| JP | 4-52488 Y2 | | 12/1992 |
| JP | 8-2500 Y2 | | 1/1996 |
| JP | 972339 | * | 3/1997 |
| JP | 2001-173658 A | | 6/2001 |
| JP | 2003269458 | * | 9/2003 |
| JP | 2004-263771 | | 9/2004 |
| JP | 2005-008737 | | 1/2005 |
| JP | 2005-054007 | | 3/2005 |

OTHER PUBLICATIONS

International Search Report for PCT/JP2009/004102, mailed Oct. 6, 2009.

* cited by examiner

SYNTHETIC RESIN-MADE THRUST SLIDING BEARING

This application is the U.S. national phase of International Application No. PCT/JP2009/004102 filed 25 Aug. 2009, which designated the U.S. and claims priority to Japan Application No. 2008-217450 filed 26 Aug. 2008, the entire contents of each of which are hereby incorporated by reference.

TECHNICAL FIELD

The present invention relates particularly to a synthetic resin-made thrust sliding bearing, and more particularly to a synthetic resin-made thrust sliding bearing which is suitably incorporated as a thrust sliding bearing of a strut-type suspension (Macpherson type) in a four-wheeled motor vehicle.

BACKGROUND ART

In general, a strut-type suspension is mainly used in a front wheel of a four-wheeled motor vehicle, and is constructed such that a strut assembly incorporating a hydraulic shock absorber in a cylinder formed integrally with a main shaft is combined with a coil spring. Among such suspensions, there is a type of structure in which the axis of the coil spring is actively offset with respect to the axis of the strut, so as to allow the sliding of a piston rod of the shock absorber incorporated in the strut to be effected smoothly. There is another type of structure in which the coil spring is disposed by aligning the axis of the coil spring with the axis of the strut. In either structure, a thrust bearing is disposed between a mounting member for a motor vehicle body and an upper spring seat of the coil spring to allow the rotation to be effected smoothly when the strut assembly rotates together with the coil spring by the steering operation.

In this thrust bearing, a rolling bearing using balls or needles or a synthetic resin-made sliding bearing is used. However, the rolling bearing has a possibility of causing a fatigue failure in the balls or needles owing to such as infinitesimal oscillations and a vibratory load, so that there is a problem in that it is difficult to maintain a smooth steering operation. As compared with the rolling bearing, the sliding bearing has a high frictional torque and therefore has the problem that the steering operation is made heavy. Furthermore, both bearings have the problem that the steering operation is made heavy due to the high frictional force of a dust seal formed of a rubber elastomer fitted to prevent the ingress of foreign objects such as dust onto sliding surfaces, and the synthetic resin-made sliding bearing in particular has the problem that the steering operation is made much heavier.

To overcome the above-described problems, the present applicant proposed thrust sliding bearings which are each comprised of a synthetic resin-made upper easing, a synthetic resin-made lower casing, and a synthetic resin-made thrust bearing piece interposed between the upper and lower casings, wherein the upper and lower casings are combined by elastic fitting, and a resiliently fitting portion and a sealing portion based on labyrinth action are respectively formed between the upper and lower casings and between an inner peripheral surface side and an outer peripheral surface side, to prevent the entry of foreign objects such as dust onto the bearing sliding surface by means of that sealing portion (described in Patent Document 1, Patent Document 2, Patent Document 3, Patent Document 4, and Patent Document 5).

This thrust bearing will be described with reference to drawings as follows. In FIG. 9, a synthetic resin-made thrust sliding bearing 1 is comprised of a synthetic resin-made upper casing 10, a synthetic resin-made lower casing 20, and a synthetic resin-made thrust bearing piece 30 interposed between the upper and lower casings 10 and 20. The upper casing 10 includes a circular annular flat plate-shaped portion 12 having a circular hole 11 in its central portion, a cylindrical engaging suspended portion 13 formed integrally at an outer peripheral edge of the circular annular flat plate-shaped portion 12, and a hook-shaped engaging portion 14 formed on an inner peripheral surface of an end portion of the cylindrical engaging suspended portion 13. Meanwhile, the lower casing 20 includes a cylindrical portion 22 having an inner peripheral surface defining an insertion hole 21, an annular wide collar portion 24 formed integrally on an outer peripheral surface of the cylindrical portion 22 in such a manner as to cause a portion 23 of the cylindrical portion 22 to project, a cylindrical engaging projecting portion 25 formed integrally at an outer peripheral edge of the annular wide collar portion 24, and an engaging portion 26 formed on an outer peripheral surface of an end of the cylindrical engaging projecting portion 25. The upper casing 10 is combined with the lower casing 20 by causing the engaging portion 14 to be resiliently fitted to the engaging portion 26 of the lower easing 20.

PRIOR ART DOCUMENTS

Patent Documents

[Patent Document 1] JP-UM-B-4-52488
[Patent Document 2] JP-UM-B-2-1532
[Patent Document 3] JP-UM-B-2-6263
[Patent Document 4] JP-UM-B-8-2500
[Patent Document 5] JP-UM-B-4-47445

SUMMARY OF THE INVENTION

Problems that the Invention is to Solve

With these thrust sliding bearings, the dust seal, which is formed of a rubber elastomer and fitted between the sliding surfaces with the intermediacy of a lubricating grease in such a manner as to surround the sliding surfaces is made unnecessary, so that it is possible to overcome the problem of an increase in the steering operating force caused by the dust seal, and it is possible to obtain a stable and smooth steering operating force by preventing as practically as possible the entry of foreign objects such as dust onto the sliding surfaces.

However, a problem was newly found in that, depending on the combination of synthetic resins for forming the upper and lower casings and the thrust bearing piece interposed between the upper and lower casings in the above-described thrust sliding bearing, and, in addition to the combination of these synthetic resins, depending on the combination of a lubricating grease interposed at sliding interfaces between, on the one hand, the upper and lower casings and, on the other hand, the thrust bearing piece interposed between the upper and lower casings, a stick-slip phenomenon can occur between each of the upper and lower casings and the thrust bearing piece, and abnormal frictional noise attributable to the stick-slip phenomenon can often be generated.

As a factor for the occurrence of this stick-slip phenomenon, the present inventors focused attention on the lubricating grease interposed between the sliding surfaces. Conventionally, a silicone grease having outstanding characteristics such as (a) that even if exposed to high temperatures for long periods, it is stable, (b) that a viscosity change due to temperature is small, and it excels in heat resistance and oxidation resistance, (c) that the volatilization volume is very small, and (d) the viscosity does not change much at shear velocity is used as the lubricating grease interposed between the sliding surfaces. Even with such a silicone grease, however, depending on such as the kind and viscosity of the base oil for forming the silicone grease or the relative degree of the worked penetration of the grease containing a thickener in the base oil, problems appear in that friction and wear characteristics are caused to decline and the occurrence of the stick-slip phenomenon is promoted.

As a result of conducting strenuous studies to overcome the above-described problems, the present inventors found that, a silicone grease in which the coefficient of kinematic viscosity of the base oil for forming the silicone grease and the worked penetration of the grease containing a thickener in that base oil have a predetermined range is interposed at the sliding interfaces between, on the one hand, the upper and lower casings and, on the other hand, the thrust bearing piece interposed between the upper and lower casings in the thrust sliding bearing, low friction characteristics are exhibited to allow smooth sliding to be effected over extended periods of time, and the occurrence of the stick-slip phenomenon during sliding can be prevented, thereby making it possible to prevent the generation of abnormal frictional noise attributable to the occurrence of the stick-slip phenomenon.

The present invention has been devised on the basis of the above-described finding, and its object is to provide a synthetic resin-made thrust sliding bearing which is comprised of synthetic resin-made upper and lower casings and a synthetic resin-made thrust bearing piece interposed between the upper and lower casings, and which is capable of maintaining low friction characteristics over extended periods of time and preventing the occurrence of the stick-slip phenomenon during sliding, thereby making it possible to prevent the generation of abnormal frictional noise attributable to the occurrence of the stick-slip phenomenon.

Means for Overcoming the Problems

A synthetic resin-made thrust sliding bearing in accordance with the present invention includes: a synthetic resin-made upper casing having an upper annular flat plate-shaped portion; a synthetic resin-made lower easing having a lower annular flat plate-shaped portion which is superposed on the upper casing so as to be rotatable about an axis of the upper casing and opposes the upper annular flat plate-shaped portion, a first and a second annular projection disposed on the lower annular flat plate-shaped portion concentrically therewith, and a lower annular recess surrounded by the first and the second annular projection; and a synthetic resin-made thrust bearing piece constituted by a disk which is disposed in the lower annular recess, is brought into sliding contact with an upper surface of the lower annular flat plate-shaped portion defining a bottom surface of the lower annular recess and a lower surface of the upper annular flat plate-shaped portion, and has a circular hole in a central portion thereof, the upper casing being combined with the lower casing by causing an outer peripheral edge thereof to be resiliently fitted to an outer peripheral edge of the lower casing, the synthetic resin-made thrust sliding bearing characterized in that a silicone grease whose base oil is a silicone oil, whose coefficient of kinematic viscosity at 25° C. is not less than 100 cSt and not more than 500,000 cSt, and which contains a thickener so as to set its worked penetration to not less than 200 and not more than 400 is interposed at sliding interfaces between, on the one hand, the upper surface of the lower annular flat plate-shaped portion defining the bottom surface of the lower annular recess and the lower surface of the upper annular flat plate-shaped portion and, on the other hand, an upper surface and a lower surface of the thrust bearing piece which are respectively brought into sliding contact therewith.

According to the synthetic resin-made thrust sliding bearing in accordance with the present invention, a silicone grease whose base oil is a silicone oil, whose coefficient of kinematic viscosity at 25° C. is not less than 100 cSt and not more than 500,000 cSt (not less than 100 mm$^2$/s and not more than 500,000 mm$^2$/s), preferably not less than 1,000 cSt and not more than 100,000 cSt (not less than 1,000 mm$^2$/s and not more than 100,000 mm$^2$/s), and which contains a thickener so as to set its worked penetration to not less than 200 and not more than 400, preferably not less than 250 and not more than 350, is interposed at sliding interfaces between, on the one hand, the synthetic resin-made upper and lower casings and, on the other hand, the synthetic resin-made thrust bearing piece interposed between the upper and lower casings. Therefore, low friction characteristics are exhibited for extended periods of time to enable smooth sliding, and the stick-slip phenomenon does not occur during sliding, so that abnormal frictional noise attributable to that stick-slip phenomenon is not generated. If the worked penetration is less than 200, the grease is too hard and exhibits a tendency of an increase in the starting torque of the thrust sliding bearing, whereas if the worked penetration exceeds 400, the grease is too soft, fails to stay at the sliding interfaces, and is easily squeezed out from the interfaces, so that the service life of the grease itself is shortened, and there is a possibility of leaking from the thrust sliding bearing to the outside.

The silicone oil for forming the base oil is selected from straight silicone oils such as dimethyl silicone oil and methylphenyl silicone oil, or modified silicone oils containing an alkyl group, an aminopropyl group, a polyether group, and a fluoro group, and a straight silicone oil, in particular, is preferably used.

As the thickener which is contained in the base oil, at one kind of the following is used: soap-based thickeners such as lithium soap, sodium soap, aluminum soap, calcium soap, and barium soap; compound soap-based thickeners such as a lithium complex, an aluminum complex, a calcium complex, and a barium complex; urea-based thickeners such as aliphatic diurea, alicyclic diurea, aromatic diurea, triurea, and polyurea; organic thickeners such as sodium terephthalate, polytetrafluoroethylene (PTFE), and melamine cyanurate (MCA); and inorganic thickeners such as bentonite, silica, graphite, molybdenum disulfide, and carbon black. Among others, lithium soap such as lithium stearate and lithium hydroxy stearate [lithium 12-hydroxystearate: 12(OH)StLi], PTFE, melamine cyanurate, molybdenum disulfide, and the like are preferably used.

The thickener is preferably contained in the base oil constituted by the aforementioned silicone oil at a ratio of not less than 3 wt. % and not more than 50 wt. %. At a compounding ratio of less than 3 wt. % with respect to the base oil, the worked penetration is low and such a grease is difficult to use, whereas if the thickener is compounded in excess of 50 wt. %, the worked penetration of the resultant grease is large and such a grease is too hard, with the result that the torque becomes large, and such a grease is not preferable in practical use.

Various additives may be added, as desired, to the silicone grease used in the synthetic resin-made thrust sliding bearing in accordance with the present invention in order to improve various characteristics. For example, the additives include antioxidants including amine compounds such as phenyl-1-naphthylamine, 2,6-t-butylphenol-based compounds, sulfur compounds, and zinc dithiophosphate-based compounds;

rust inhibitors including organic sulfonates of alkali metals or alkali earth metals, alkyl- or alkenylsuccinic acid derivatives such as alkyl- or alkenylsuccinic acid esters, and partial esters of polyalcohols such as sorbitan monooleate; and oiliness agents such as fatty acids and animal and plant oils. The compounding ratio of these additives is 0.1 to 1 wt. % or thereabouts.

In the synthetic resin-made thrust sliding bearing in accordance with the present invention, the upper annular flat plate-shaped portion may have a circular hole in a central portion thereof, and the lower annular flat plate-shaped portion may have in a central portion thereof an insertion hole communicating with the circular hole of the upper annular flat plate-shaped portion. Further, the upper casing may have a cylindrical engaging suspended portion formed integrally on an outer peripheral edge of the upper annular flat plate-shaped portion and an engaging portion formed on an inner peripheral surface of the cylindrical engaging suspended portion, and the lower casing may have an engaged portion formed on an outer peripheral surface of the second annular projection, the first annular projection having an inside diameter identical to that of the insertion hole of the lower annular flat plate-shaped portion and being formed integrally on the upper surface of the lower annular flat plate-shaped portion, the second annular projection being formed integrally on an outer peripheral edge of the lower annular flat plate-shaped portion in such a manner as to be radially outwardly spaced apart a predetermined interval from the first annular projection, so as to form the lower annular recess in cooperation with the first annular projection and the upper surface of the lower annular flat plate-shaped portion, the upper casing being combined with the lower casing by causing the engaging portion to be resiliently fitted to the engaged portion.

According to this synthetic resin-made thrust sliding bearing, since the upper and lower casings are combined with each other by causing the engaging portion to be resiliently fitted to the engaged portion, its assembling operation can be performed very simply.

In the synthetic resin-made thrust sliding bearing in accordance with the present invention, an inner peripheral surface of the thrust bearing piece defining the circular hole in the central portion thereof may have a diameter larger than an outside diameter of the first annular projection, and an outer peripheral surface of the thrust bearing piece may have an outside diameter smaller than an inside diameter of the second annular projection. Further, the thrust bearing piece may be disposed in the lower annular recess with annular clearances provided respectively between the inner peripheral surface defining the circular hole and an outer peripheral surface of the first annular projection and between that outer peripheral surface and an inner peripheral surface of the second annular projection, a silicone grease equivalent to the silicone grease may be filled and held in each of the annular clearances.

According to such a synthetic resin-made thrust sliding bearing, since the silicone grease is constantly supplied to the sliding interface between the lower surface of the thrust bearing piece and the upper surface of the lower annular flat plate-shaped portion defining the bottom surface of the annular recess, low friction characteristics are exhibited over extended periods of time to enable smooth sliding.

In one aspect, the synthetic resin-made thrust sliding bearing in accordance with the present invention may be constructed such that the upper annular flat plate-shaped portion has a circular hole in a central portion thereof, and the lower annular flat plate-shaped portion has in a central portion thereof an insertion hole communicating with the circular hole of the upper annular flat plate-shaped portion, such that the upper casing has a cylindrical suspended portion formed integrally on the lower surface of the upper annular flat plate-shaped portion in such a manner as to be radially outwardly spaced apart a predetermined interval from a peripheral edge of the circular hole of the upper annular flat plate-shaped portion, a cylindrical engaging suspended portion formed integrally on an outer peripheral edge of the upper annular flat plate-shaped portion in such a manner as to be radially outwardly spaced apart a predetermined interval from the cylindrical suspended portion, so as to form an upper outer annular groove in cooperation with the cylindrical suspended portion, and an engaging portion formed on an inner peripheral surface of the cylindrical engaging suspended portion, and such that the lower casing has an annular engaging projection formed integrally on an outer peripheral edge of the lower annular flat plate-shaped portion in such a manner as to be radially outwardly spaced apart a predetermined interval from the second annular projection, so as to form a lower outer annular groove in cooperation with the second annular projection, and the engaged portion formed on an outer peripheral surface of the annular engaging projection, the first annular projection having an inside diameter identical to that of the insertion hole of the lower annular flat plate-shaped portion and being formed integrally on the upper surface of the lower annular flat plate-shaped portion, the second annular projection being formed integrally on the upper surface of the lower annular flat plate-shaped portion in such a manner as to be radially outwardly spaced apart a predetermined interval from the first annular projection, so as to form the lower annular recess in cooperation with the first annular projection and the upper surface of the lower annular flat plate-shaped portion, the upper casing being combined with the lower casing by disposing the cylindrical suspended portion in the lower outer annular groove so as to be radially superposed on each of the second annular projection and the annular engaging projection, and by causing the engaging portion to be resiliently fitted to the engaged portion.

According to the synthetic resin-made thrust sliding bearing in accordance with this aspect, sealed portions based on labyrinth action are formed at superposed portions of, on the one hand, the cylindrical suspended portion and, on the other hand, the second annular projection and the annular engaging projection and at resiliently fitting portions of the engaging portion and the engaged portion. As a result, it is possible to prevent the entry of foreign objects such as dust onto sliding interfaces between the upper and lower casings and, hence, between, on the one hand, the upper and lower casings and, on the other hand, the thrust bearing piece interposed between the upper and lower casings, so that smooth sliding is effected constantly.

In the above-described synthetic resin-made thrust sliding bearing, an inner peripheral surface of the thrust bearing piece defining the circular hole in a central portion thereof may have a diameter larger than an outside diameter of the first annular projection, and an outer peripheral surface of the thrust bearing piece may have an outside diameter smaller than an inside diameter of the second annular projection. Further, the thrust bearing piece may be disposed in the lower annular recess with annular clearances provided respectively between the inner peripheral surface defining the circular hole and an outer peripheral surface of the first annular projection and between that outer peripheral surface and an inner peripheral surface of the second annular projection, a silicone grease equivalent to the silicone grease may be filled and held in each of the annular clearances and the lower outer annular groove.

According to this synthetic resin-made thrust sliding bearing, since the silicone grease is constantly supplied to the sliding interface between the lower surface of the thrust bearing piece and the upper surface of the lower annular flat plate-shaped portion defining the bottom surface of the annular recess of the lower casing, low friction characteristics are exhibited over extended periods of time to enable smooth sliding. At the same time, as the silicone grease is filled and held in the lower outer annular groove, foreign objects such as dust which entered from the resiliently fitting portions of the engaging portion and the engaged portion are captured by the silicone grease filled and held in that lower outer annular groove, and are thereby prevented from entering the sliding interface. Hence, a dual prevention effect is exhibited with respect to the entry of foreign objects such as dust by virtue of the silicone grease and the sealed portions based on the labyrinth action.

In the synthetic resin-made thrust sliding bearing in accordance with the present invention, the upper annular flat plate-shaped portion may have a circular hole in a central portion thereof, and the lower annular flat plate-shaped portion may have in a central portion thereof an insertion hole communicating with the circular hole of the upper annular flat plate-shaped portion. Further, the upper casing may have a first cylindrical suspended portion formed integrally on the lower surface of the upper annular flat plate-shaped portion and having an inside diameter identical to that of the circular hole of the upper annular flat plate-shaped portion, a second cylindrical suspended portion formed integrally on the lower surface of the upper annular flat plate-shaped portion in such a manner as to be radially outwardly spaced apart a predetermined interval from an outer peripheral surface of the first cylindrical suspended portion, so as to form an upper annular recess in cooperation with the first cylindrical suspended portion and the lower surface of the upper annular flat plate-shaped portion, a cylindrical engaging suspended portion formed integrally on an outer peripheral edge of the upper annular flat plate-shaped portion in such a manner as to be radially outwardly spaced apart a predetermined interval from the second cylindrical suspended portion, so as to form an upper outer annular groove in cooperation with the second cylindrical suspended portion, and an engaging portion formed on an inner peripheral surface of the cylindrical engaging suspended portion. Still further, the lower casing may have an annular engaging projection formed integrally on an outer peripheral edge of the lower annular flat plate-shaped portion in such a manner as to be radially outwardly spaced apart a predetermined interval from an outer peripheral surface of the second annular projection, so as to form a lower outer annular groove in cooperation with the second annular projection and the upper surface of the lower annular flat plate-shaped portion, and the engaged portion formed on the outer peripheral surface of the annular engaging projection, the first annular projection being formed integrally on the upper surface of the lower annular flat plate-shaped portion in such a manner as to be radially outwardly spaced apart from the insertion hole of the lower annular flat plate-shaped portion via an annular shoulder portion, the second annular projection being formed integrally on the upper surface of the upper annular flat plate-shaped portion in such a manner as to be radially outwardly spaced apart a predetermined interval from the first annular projection, so as to form the lower annular recess in cooperation with the first annular projection and the upper surface of the upper annular flat plate-shaped portion, the upper casing being combined with the lower casing by radially superposing the first cylindrical suspended portion on the first annular projection, by disposing the second cylindrical suspended portion in the lower outer annular groove so as to be radially superposed on each of the second annular projection and the annular engaging projection, and by causing the engaging portion to be resiliently fitted to the engaged portion.

According to the synthetic resin-made thrust sliding bearing in accordance with this aspect, sealed portions based on labyrinth action are formed at superposed portions of the first cylindrical suspended portion and the first annular projection, at superposed portions of, on the one hand, the second cylindrical suspended portion and, on the other hand, the second annular projection and the annular engaging projection, and at resiliently fitting portions of the engaging portion and the engaged portion. As a result, it is possible to prevent the entry of foreign objects such as dust onto sliding interfaces between the upper and lower casings and, hence, between, on the one hand, the upper and lower casings and, on the other hand, the thrust bearing piece interposed between the upper and lower casings, so that smooth sliding is effected constantly.

In the synthetic resin-made thrust sliding bearing in accordance with the above-described aspect, an inner peripheral surface of the thrust bearing piece defining the circular hole in a central portion thereof may have a diameter larger than an outside diameter of the first annular projection, and an outer peripheral surface of the thrust bearing piece may have an outside diameter smaller than an inside diameter of the second annular projection. Further, the thrust bearing piece may be disposed in the lower annular recess with annular clearances provided respectively between the inner peripheral surface defining the circular hole and an outer peripheral surface of the first annular projection and between that outer peripheral surface and an inner peripheral surface of the second annular projection, a silicone grease equivalent to the silicone grease being filled and held in each of the annular clearances and the lower outer annular groove.

According to the above-described synthetic resin-made thrust sliding bearing, since the silicone grease is constantly supplied to the sliding interface between the lower surface of the thrust bearing piece and the upper surface of the lower annular flat plate-shaped portion defining the bottom surface of the annular recess, low friction characteristics are exhibited over extended periods of time to enable smooth sliding. At the same time, as the silicone grease is filled and held in the lower outer annular groove, foreign objects such as dust which entered from the resiliently fitting portions of the engaging portion and the engaged portion are captured by the silicone grease filled and held in the outer annular groove, and are thereby prevented from entering the sliding interface. Hence, a dual prevention effect is exhibited with respect to the entry of foreign objects such as dust by virtue of the silicone grease and the sealed portions based on the aforementioned labyrinth action.

In another aspect of the synthetic resin-made thrust sliding bearing in accordance with the present invention, the upper annular flat plate-shaped portion may have a circular hole in a central portion thereof, and the lower annular flat plate-shaped portion may have in a central portion thereof an insertion hole communicating with the circular hole of the upper annular flat plate-shaped portion. Further, the upper casing may have a first cylindrical suspended portion formed integrally on the lower surface of the upper annular flat plate-shaped portion via the circular hole of the upper annular flat plate-shaped portion and an annular shoulder portion, a second cylindrical suspended portion formed integrally on the lower surface of the upper annular flat plate-shaped portion in such a manner as to be radially outwardly spaced apart a predetermined interval from an outer peripheral surface of the first cylindrical suspended portion, so as to form an upper annular recess in cooperation with the first cylindrical suspended portion and the lower surface of the upper annular flat plate-shaped portion, a cylindrical engaging suspended portion formed integrally on an outer peripheral edge of the upper annular flat plate-shaped portion in such a manner as to be radially outwardly spaced apart a predetermined interval from the second cylindrical suspended portion, so as to form an upper outer annular groove in cooperation with the second cylindrical suspended portion, and an engaging portion formed on an inner peripheral surface of the cylindrical engaging suspended portion. Still further, the lower casing may have a third annular projection formed integrally on the lower annular flat plate-shaped portion and having an inside diameter identical to that of the insertion hole, an annular engaging projection formed integrally on an outer peripheral edge of the lower annular flat plate-shaped portion in such a manner as to be radially outwardly spaced apart a predetermined interval from the second annular projection, so as to form a lower outer annular groove in cooperation with the second annular projection, and an engaged portion formed on the outer peripheral surface of the annular engaging projection, the first annular projection being formed integrally on the upper surface of the lower annular flat plate-shaped portion in such a manner as to be radially outwardly spaced apart a predetermined interval from the third annular projection, so as to form a lower inner annular groove in cooperation with the third annular projection, the second annular projection being formed integrally on the upper surface of the lower annular flat plate-shaped portion in such a manner as to be radially outwardly spaced apart a predetermined interval from the first annular projection, so as to form the lower annular recess in cooperation with the first annular projection and the upper surface of the lower annular flat plate-shaped portion, the upper casing being combined with the lower casing by disposing the first cylindrical suspended portion in the lower inner annular groove so as to be radially superposed on the first annular projection and the third annular projection, respectively, by disposing an end portion of the second cylindrical suspended portion in the lower outer annular groove so as to be radially superposed on the second annular projection and the annular engaging projection, respectively, and by causing the engaging portion to be resiliently fitted to the engaged portion.

According to the synthetic resin-made thrust sliding bearing in accordance with the above-described aspect, sealed portions based on labyrinth action are formed, respectively, at superposed portions of, on the one hand, the first cylindrical suspended portion and, on the other hand, the first annular projection and the third annular projection, at superposed portions of, on the one hand, the second cylindrical suspended portion and, on the other hand, the second annular projection and the annular engaging projection, and at resiliently fitting portions of the engaging portion and the engaged portion. As a result, it is possible to prevent the entry of foreign objects such as dust onto sliding interfaces between the upper and lower casings and, hence, between, on the one hand, the upper and lower casings and, on the other hand, the thrust bearing piece interposed between the upper and lower casings, so that smooth sliding is effected constantly.

In still another aspect of the synthetic resin-made thrust sliding bearing in accordance with the above-described aspect, an inner peripheral surface of the thrust bearing piece defining the circular hole in a central portion thereof may have a diameter larger than an outside diameter of the first annular projection, and an outer peripheral surface of the thrust bearing piece may have an outside diameter smaller than an inside diameter of the second annular projection. Further, the thrust bearing piece may be disposed in the lower annular recess with annular clearances provided respectively between the inner peripheral surface defining the circular hole and an outer peripheral surface of the first annular projection and between that outer peripheral surface and an inner peripheral surface of the second annular projection, a silicone grease equivalent to the silicone grease may be filled and held in each of the annular clearances, the lower inner annular groove, and the lower outer annular groove.

According to the synthetic resin-made thrust sliding bearing in accordance with the above-described aspect, since the silicone grease is constantly supplied to the sliding interface between the lower surface of the thrust bearing piece and the upper surface of the lower annular flat plate-shaped portion defining the bottom surface of the lower annular recess, low friction characteristics are exhibited over extended periods of time to enable smooth sliding. At the same time, as the silicone grease is filled and held in the lower inner annular groove and the lower outer annular groove, respectively, foreign objects such as dust which entered from the resiliently fitting portions of the engaging portion and the engaged portion or from the labyrinth portion on the inner diameter side are captured by the silicone grease filled and held in the lower inner annular groove and the lower outer annular groove, and are thereby prevented from entering the sliding interface. Hence, a dual prevention effect is exhibited on the inner diameter side and the outer diameter side with respect to the entry of foreign objects such as dust by virtue of the silicone grease and the sealed portions based on the aforementioned labyrinth action.

In a further aspect of the synthetic resin-made thrust sliding bearing in accordance with the present invention, the upper annular flat plate-shaped portion may have a circular hole in a central portion thereof, and the lower annular flat plate-shaped portion may have in a central portion thereof an insertion hole communicating with the circular hole of the upper annular flat plate-shaped portion. Further, the upper casing may have a first cylindrical suspended portion formed integrally on the lower surface of the upper annular flat plate-shaped portion and having an inside diameter identical to that of the circular hole, a second cylindrical suspended portion formed integrally on the lower surface of the upper annular flat plate-shaped portion in such a manner as to be radially outwardly spaced apart a predetermined interval from the first cylindrical suspended portion, so as to form an upper inner annular groove in cooperation with the first cylindrical suspended portion, a third cylindrical suspended portion formed integrally on the lower surface of the upper annular flat plate-shaped portion in such a manner as to be radially outwardly spaced apart a predetermined interval from the second cylindrical suspended portion, so as to form an upper annular recess in cooperation with the second cylindrical suspended portion and the lower surface of the upper annular flat plate-shaped portion, a cylindrical engaging suspended portion formed integrally on an outer peripheral edge of the upper annular flat plate-shaped portion in such a manner as to be radially outwardly spaced apart a predetermined interval from the third cylindrical suspended portion, so as to form an upper outer annular groove in cooperation with the third cylindrical suspended portion, and an engaging portion formed on an inner peripheral surface of the cylindrical engaging suspended portion. Still further, the lower casing may have a third annular projection formed integrally on the upper surface of the lower annular flat plate-shaped portion in such a manner as to be radially outwardly spaced apart from the insertion hole via an annular shoulder portion, an annular engaging projection formed integrally on an outer peripheral edge of the lower annular flat plate-shaped portion in such a manner as to be radially outwardly spaced apart a predetermined interval from the second annular projection, so as to form a lower outer annular groove in cooperation with the second annular projection, and an engaged portion formed on the outer peripheral surface of the annular engaging projection, the first annular projection being formed integrally on the upper surface of the lower annular flat plate-shaped portion in such a manner as to be radially outwardly spaced apart a predetermined interval from the third annular projection so as to form a+ lower inner annular groove in cooperation with the third annular projection, the second annular projection being formed integrally on the upper surface of the lower annular flat plate-shaped portion in such a manner as to be radially outwardly spaced apart a predetermined interval from the first annular projection, so as to form the lower annular recess in cooperation with the first annular projection and the upper surface of the lower annular flat plate-shaped portion, the upper casing being combined with the lower casing by causing the first cylindrical suspended portion to face the annular shoulder portion of the lower casing so as to be radially superposed on an end portion of the third annular projection, by disposing the second cylindrical suspended portion in the lower inner annular groove so as to be radially superposed on the first annular projection and the third annular projection, respectively, by disposing the third cylindrical suspended portion in the lower outer annular groove so as to be radially superposed on the second annular projection and the annular engaging projection, respectively, and by causing the engaging portion to be resiliently fitted to the engaged portion.

According to the synthetic resin-made thrust sliding bearing in accordance with the above-described aspect, sealed portions based on labyrinth action are formed, respectively, at superposed portions of the first cylindrical suspended portion and the third annular projection, at superposed portions of, on the one hand, the second cylindrical suspended portion and, on the other hand, the first annular projection and the third annular projection, at superposed portions of, on the one hand, the third cylindrical suspended portion and, on the other hand, the second annular projection and the annular engaging projection, and at resiliently fitting portions of the engaging portion and the engaged portion. As a result, it is possible to prevent the entry of foreign objects such as dust onto sliding interfaces between the upper and lower casings and, hence, between, on the one hand, the upper and lower casings and, on the other hand, the thrust bearing piece interposed between the upper and lower casings, so that smooth sliding is effected constantly.

In a still further aspect of the synthetic resin-made thrust sliding bearing in accordance with the above-described aspect, an inner peripheral surface of the thrust bearing piece defining the circular hole in a central portion thereof may have a diameter larger than an outside diameter of the first annular projection, and an outer peripheral surface of the thrust bearing piece may have an outside diameter smaller than an inside diameter of the second annular projection. Further, the thrust bearing piece may be disposed in the lower annular recess with annular clearances provided respectively between the inner peripheral surface defining the circular hole and an outer peripheral surface of the first annular projection and between that outer peripheral surface and an inner peripheral surface of the second annular projection, a silicone grease equivalent to the silicone grease may be filled and held in each of the annular clearances, the lower inner annular groove, and the lower outer annular groove.

According to the synthetic resin-made thrust sliding bearing in accordance with this aspect, since the silicone grease is constantly supplied to the sliding interface between the lower surface of the thrust bearing piece and the upper surface of the lower annular flat plate-shaped portion defining the bottom surface of the lower annular recess, low friction characteristics are exhibited over extended periods of time to enable smooth sliding. At the same time, as the silicone grease is filled and held in the lower inner annular groove and the lower outer annular groove, respectively, foreign objects such as dust which entered from the resiliently fitting portions of the engaging portion and the engaged portion or from the labyrinth portion on the inner diameter side are captured by the silicone grease filled and held in the lower inner annular groove and the lower outer annular groove, and are thereby prevented from entering the sliding interface. Hence, a dual prevention effect is exhibited on the inner diameter side and the outer diameter side with respect to the entry of foreign objects such as dust by virtue of the silicone grease and the sealed portions based on the aforementioned labyrinth action.

In the synthetic resin-made thrust sliding bearing in accordance with the present invention, the thrust bearing piece may have on each of the upper and lower surfaces thereof an annular groove which surrounds the circular hole and a plurality of radial grooves each having one end open at the annular groove and another end open at the outer peripheral surface and arranged in a circumferential direction. Further, the lower casing may have a cylindrical portion formed integrally on the lower surface of the lower annular flat plate-shaped portion and having an inside diameter identical to that of the insertion hole.

According to the synthetic resin-made thrust sliding bearing having a cylindrical portion formed integrally on the lower surface of the lower casing and having an inside diameter identical to that of the insertion hole, when the thrust sliding bearing is mounted to the upper spring seat, mounting can be performed by inserting the cylindrical portion into a mounting hole formed in the upper spring seat, so that the efficiency in its mounting operation is remarkably facilitated.

In the synthetic resin-made thrust sliding bearing in accordance with the present invention, as a synthetic resin for forming the upper and lower casings, a thermoplastic synthetic resin such as polyacetal resin, polyamide resin, and polyester resin is suitably used. In addition, as the synthetic resin for forming the thrust bearing piece, a thermoplastic synthetic resin such as polyacetal resin, polyamide resin, polyolefin resin, and polyester resin is suitably used.

Advantages of the Invention

According to the present invention, a silicone grease whose base oil is a silicone oil, whose coefficient of kinematic viscosity at 25° C. is not less than 100 cSt and not more than 500,000 cSt (not less than 100 mm$^2$/s and not more than 500,000 mm$^2$/s), preferably not less than 1,000 cSt and not more than 100,000 cSt (not less than 1,000 mm$^2$/s and not more than 100,000 mm$^2$/s), and which contains a thickener so as to set its worked penetration to not less than 200 and not more than 400, preferably not less than 250 and not more than 350, is interposed at the sliding interfaces between, on the one hand, the upper and lower casings and, on the other hand, the thrust bearing piece interposed between the upper and lower casings. Therefore, it is possible to provide a synthetic resin-made thrust sliding bearing which exhibits low friction characteristics to enable smooth sliding, and in which the stick-slip phenomenon does not occur during sliding, thereby making it possible to prevent the generation of abnormal frictional noise attributable to that stick-slip phenomenon. In addition, in the case where a silicone grease equivalent to the above-described silicone grease is filled and held in the lower outer annular groove and the lower inner annular groove respectively formed on the outer peripheral side or the inner peripheral side and the outer peripheral side of the lower casing, foreign objects such as dust which entered from the outside, i.e., from the resiliently fitting portions of the engaging portion and the engaged portion or from the labyrinth portion on the inner diameter side, are captured by that silicone grease and are thereby prevented from entering the sliding interface. Hence, it is possible to provide a synthetic resin-made thrust sliding bearing which exhibits a dual entry prevention effect with respect to the entry of foreign objects such as dust onto the sliding interfaces by virtue of the silicone grease and the sealed portions based on the labyrinth action.

MODE FOR CARRYING OUT THE INVENTION

Figure 1:
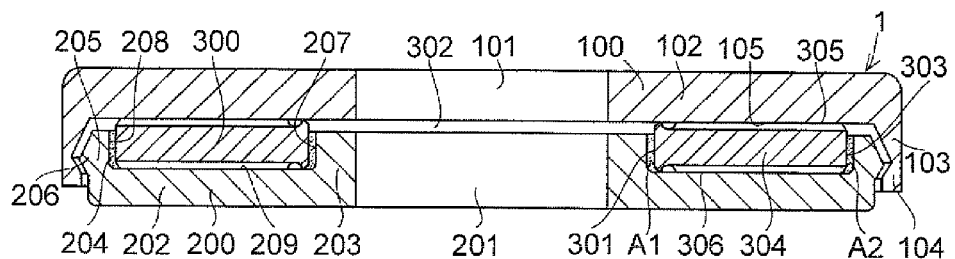
FIG. 1 is a cross-sectional view of a preferred first embodiment of the invention.

Hereafter, a more detailed description will be given of the present invention with reference to preferred embodiments shown in the drawings. It should be noted that the present invention is not limited to these embodiments.

Figure 2:
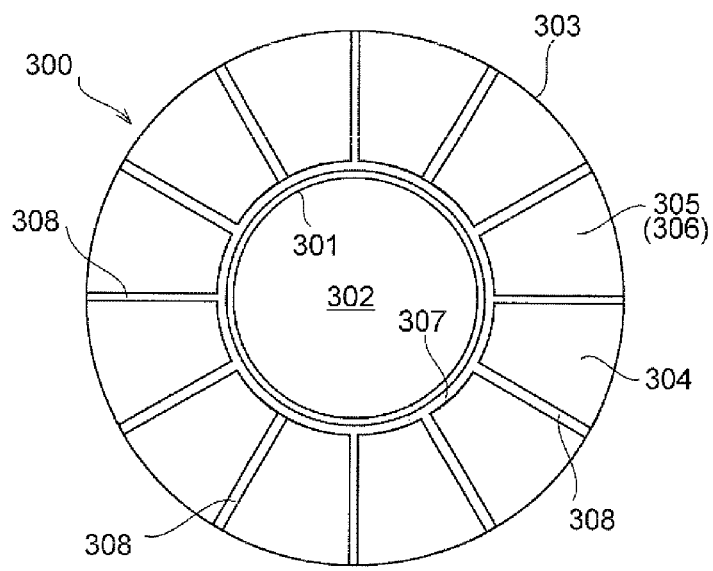
FIG. 2 is a plan view of a thrust bearing piece shown in FIG. 1.

In FIGS. 1 and 2, a synthetic resin-made thrust sliding bearing 1 in accordance with a first embodiment is comprised of a synthetic resin-made upper casing 100, a synthetic resin-made lower casing 200, and a synthetic resin-made thrust bearing piece 300 interposed between the upper and lower casings 100 and 200.

The upper casing 100 includes an upper annular flat plate-shaped portion 102 having a circular hole 101 in its central portion; a cylindrical engaging suspended portion 103 formed integrally on an outer peripheral edge of the upper annular flat plate-shaped portion 102; and an engaging portion 104 formed on an inner peripheral surface of an end portion of the cylindrical engaging suspended portion 103.

The lower casing 200 includes a lower annular flat plate-shaped portion 202 which is superposed on the upper casing 100 so as to be rotatable about the axis of that upper casing 100, opposes the upper annular flat plate-shaped portion 102, and has in its central portion an insertion hole 201 communicating with the circular hole 101; an annular projection 203 which has an inside diameter identical to that of the insertion hole 201, is formed integrally on an upper surface 209 of the lower annular flat plate-shaped portion 202, and is disposed concentrically with the lower annular flat plate-shaped portion 202; an annular engaging projection 205 which is formed integrally on an outer peripheral edge of the lower annular flat plate-shaped portion 202 in such a manner as to be radially outwardly spaced apart a predetermined interval from the annular projection 203, forms a lower annular recess 204 in cooperation with the annular projection 203 and the upper surface 209 of the lower annular flat plate-shaped portion 202, and is disposed concentrically with the lower annular flat plate-shaped portion 202; and an engaged portion 206 formed on an outer peripheral surface of an end portion of the annular engaging projection 205. The lower annular recess 204 is surrounded by the annular projection 203 and the annular engaging projection 205.

The thrust bearing piece 300, which is disposed in the lower annular recess 204 and is brought into sliding contact with the upper surface 209 of the lower annular flat plate-shaped portion 202 defining the bottom surface of the lower annular recess 204 and a lower surface 105 of the upper annular flat plate-shaped portion 101, is constituted by a disk 304 which has in its central portion a circular hole 302 defined by an inner peripheral surface 301 having an inside diameter larger than the outside diameter of the annular projection 203 and has an outer peripheral surface 303 having an outside diameter smaller than the inside diameter of the annular engaging projection 205. The thrust bearing piece 300 is disposed in the lower annular recess 204 while maintaining annular clearances A1 and A2 between its inner peripheral surface 301 and an outer peripheral surface 207 of the annular projection 203 and between its outer peripheral surface 303 and an inner peripheral surface 208 of the annular engaging projection 205, respectively. Further, the thrust bearing piece 300 is disposed between the upper and lower casings 100 and 200 such that its upper surface 305 is positioned above the opening of the lower annular recess 204 and is brought into sliding contact with the lower surface 105 of the upper annular flat plate-shaped portion 102, while its lower surface 306 is brought into sliding contact with the upper surface 209 of the lower annular flat plate-shaped portion 202 defining the bottom surface of the lower annular recess 204.

The upper casing 100 is combined with the lower casing 200 by causing the engaging portion 104 on the inner peripheral surface of the end portion of the cylindrical engaging suspended portion 103 at its outer peripheral edge to be resiliently fitted to the engaged portion 206 on the outer peripheral surface of the end portion of the annular engaging projection 205, which is the outer peripheral edge of the lower casing 200.

In the synthetic resin-made thrust sliding bearing 1, a silicone grease whose base oil is a silicone oil and which contains a thickener is interposed at sliding interfaces between, on the one hand, the lower surface 105 of the upper annular flat plate-shaped portion 101 and the upper surface 209 of the lower annular flat plate-shaped portion 202 defining the bottom surface of the lower annular recess 204, and, on the other hand, the upper and lower surfaces 305 and 306 of the thrust bearing piece 300 which are respectively brought into sliding contact therewith by being disposed in the lower annular recess 204. Also, an equivalent silicone grease is filled and held in the annular clearances A1 and A2.

The silicone oil for forming the base oil is a straight silicone oil such as dimethyl silicone oil or methylphenyl silicone oil, or a modified silicone oil containing an alkyl group, an aminopropyl group, a polyether group, a fluoro group, and the like. The coefficient of kinematic viscosity of the base oil at 25° C. should preferably be not less than 100 cSt and not more than 500,000 cSt (not less than 100 mm²/s and not more than 500,000 mm²/s), more preferably not less than 1,000 cSt and not more than 100,000 cSt (not less than 1,000 mm²/s and not more than 100,000 mm²/s). If the coefficient of kinematic viscosity at 25° C. is less than 100 cSt, the base oil is likely to separate from the grease, whereas if the coefficient of kinematic viscosity at 25° C. exceeds 500,000 cSt, the torque at the time of the start and running of the thrust sliding bearing becomes high, making it impossible for low friction characteristics to be displayed.

As the thickener which is contained in the base oil, at one kind of the following is used: soap-based thickeners such as lithium soap, sodium soap, aluminum soap, calcium soap, and barium soap; compound soap-based thickeners such as a lithium complex, an aluminum complex, a calcium complex, and a barium complex; urea-based thickeners such as aliphatic diurea, alicyclic diurea, aromatic diurea, triurea, and polyurea; organic thickeners such as sodium terephthalate, polytetrafluoroethylene (PTFE), and melamine cyanurate (MCA); and inorganic thickeners such as bentonite, silica gel, graphite, molybdenum disulfide, and carbon black. Among others, lithium soap such as lithium stearate and lithium hydroxy stearate (lithium 12-hydroxystearate), PTFE, melamine cyanurate, molybdenum disulfide, and the like are preferably used.

The compounding ratio of the thickener is determined such that the worked penetration (measured in accordance with JIS K 2220 5.3) of the resultant grease becomes not less than 200 and not more than 400, preferably not less than 250 and not more than 350. Specifically, the thickener is preferably compounded with the base oil at a ratio of not less than 3 wt. % and not more than 50 wt. %. At a compounding ratio of less than 3 wt. % with respect to the base oil, the worked penetration is low and such a grease is difficult to use, whereas if the thickener is compounded in excess of 50 wt. %, the worked penetration of the resultant grease is large and such a grease is too hard, with the result that the torque becomes large, and such a grease is not preferable in practical use.

A description will be given of the compositions of silicone grease which is suitably used in the synthetic resin-made thrust sliding bearing 1 of the present invention.

(1) A silicone grease in which 15 wt. % of a molybdenum disulfide ($MoS_2$) powder and 25 wt. % of a PTFE powder are added as thickeners to 60 wt. % of methylphenyl silicone oil as a base oil whose coefficient of kinematic viscosity at 25° C. exhibits 450 cSt (450 mm²/s), and a worked penetration obtained by uniformly kneading them is set to 275.

(2) A silicone grease in which 25 wt. % of melamine cyanurate (MCA) and 10 wt. % of a PTFE powder are added as thickeners to 65 wt. % of dimethyl silicone oil as a base oil whose coefficient of kinematic viscosity at 25° C. exhibits 500 cSt (500 mm²/s), and a worked penetration obtained by uniformly kneading them is set to 270.

(3) A silicone grease in which 26 wt. % of lithium hydroxy stearate (lithium 12-hydroxystearate: 12(OH)StLi) is added as a thickener to 74 wt. % of methylphenyl silicone oil as a base oil whose coefficient of kinematic viscosity at 25° C. exhibits 3,000 cSt (3,000 mm²/s), heating and mixing are conducted for 2 hours at a temperature of 185° C., followed by cooling, and a worked penetration obtained by uniformly kneading them is set to 279.

(4) A silicone grease in which 40 wt. % of a PTFE powder is added as a thickener to 60 wt. % of dimethyl silicone oil as a base oil whose coefficient of kinematic viscosity at 25° C. exhibits 6,500 cSt (6,500 mm²/s), and a worked penetration obtained by uniformly kneading them is set to 250.

(5) A silicone grease in which 5 wt. % of lithium hydroxy stearate (lithium 12-hydroxystearate: 12(OH)StLi) is added as a thickener to 95 wt. % of methylphenyl silicone oil as a base oil whose coefficient of kinematic viscosity at 25° C. exhibits 11,000 cSt (11,000 mm²/s), heating and mixing are conducted for 2 hours at a temperature of 185° C., followed by cooling, and a worked penetration obtained by uniformly kneading them is set to 258.

(6) A silicone grease in which 8 wt. % of a fine silica powder is added as a thickener to 92 wt. % of dimethyl silicone oil as a base oil whose coefficient of kinematic viscosity at 25° C. exhibits 200,000 cSt (200,000 mm²/s), and a worked penetration obtained by uniformly kneading them is set to 300.

Each of these silicone greases (1) to (6) was applied to the sliding interfaces of the thrust sliding bearing 1 shown in FIG. 1, i.e., the sliding interfaces between, on the one hand, the upper and lower casings 100 and 200 and, on the other hand, the thrust bearing piece 300 interposed between the upper and lower casings 100 and 200. The lower casing 200 was fixed, a load of 4.5 kN was applied from the upper surface side of the upper casing 200, and a 50-cycle swinging motion was performed at a swinging velocity of 0.5 Hz and at a swinging angle of ±40°. The torque (Nm) at that time was measured, and a test was conducted on the presence or absence of the stick-slip phenomenon and the presence or absence of the occurrence of abnormal frictional noise. The test results are shown in Tables 1 and 2. It should be noted that the upper and lower casings 100 and 200 of the synthetic resin-made thrust sliding bearing 1 used in the test were formed of a polyacetal resin, and the thrust bearing piece 300 was fabricated of a polyethylene resin.

TABLE 1

| | Silicone Grease Composition | | |
|---|---|---|---|
| | (1) | (2) | (3) |
| Base oil | Methylphenyl | Dimethyl | Methylphenyl |
| Coefficient of kinematic viscosity (cSt) | 450 | 500 | 3,000 |
| Thickener | $MoS_2$ PTFE | MCA PTFE | 12(OH)StLi |
| Worked penetration | 275 | 270 | 279 |
| Torque (Nm) | 2.0 | 2.0 | 1.7 |
| Presence or absence of occurrence of abnormal frictional noise | none | none | none |

TABLE 2

| | Silicone Grease Composition | | |
|---|---|---|---|
| | (4) | (5) | (6) |
| Base oil | Dimethyl | Methylphenyl | Dimethyl |
| Coefficient of kinematic viscosity (cSt) | 6,500 | 11,000 | 200,000 |
| Thickener | PTFE | 12(OH)StLi | Silica |
| Worked penetration | 250 | 258 | 300 |
| Torque (Nm) | 1.5 | 1.5 | 1.5 |
| Presence or absence of occurrence of abnormal frictional noise | none | none | none |

A silicone grease exemplified by the silicone grease compositions (1) to (6) above is interposed at the sliding interfaces between, on the one hand, the lower surface 105 of the upper annular flat plate-shaped portion 102 of the upper casing 100 and the upper surface 209 of the lower annular flat plate-shaped portion 202 defining the bottom surface of the lower annular recess 204, and, on the other hand, the upper and lower surfaces 305 and 306 of the thrust bearing piece 300 which are respectively brought into sliding contact therewith by being disposed in the lower annular recess 204 of the lower casing 200. In consequence, low friction characteristics are exhibited to enable smooth sliding, and the stick-slip phenomenon does not occur during sliding, so that abnormal frictional noise attributable to the stick-slip phenomenon is not generated. In addition, as the silicone grease is filled and held in the annular clearances A1 and A2, the silicone grease is constantly supplied to the sliding interface between the lower surface 306 of the thrust bearing piece 300 and the upper surface 209 of the lower annular flat plate-shaped portion 202 defining the bottom surface of the lower annular recess 204, so that low friction characteristics are exhibited over extended periods of time to enable smooth sliding.

In the synthetic resin-made thrust sliding bearing 1, as shown in FIG. 2, the thrust bearing piece 300 should preferably have on each of its upper and lower surfaces 305 and 306 an annular groove 307 which surrounds the circular hole 302, as well as a plurality of radial grooves 308 each having one end open at the annular groove 307 and the other end open at the outer peripheral surface 303 and arranged at equal intervals in the circumferential direction. A silicone grease equivalent to the above-described silicone grease is filled and held in these annular grooves 307 and radial grooves 308.

As a synthetic resin for forming the upper casing 100 and the lower casing 200, a thermoplastic synthetic resin such as polyacetal resin, polyamide resin, and polyester resin is suitably used. In addition, as the synthetic resin for forming the thrust bearing piece 300, a thermoplastic synthetic resin such as polyacetal resin, polyamide resin, polyolefin resin, and polyester resin, which excel in the sliding characteristics with respect to the thermoplastic synthetic resin for forming the upper and lower casings 100 and 200, is suitably used.

Figure 3:
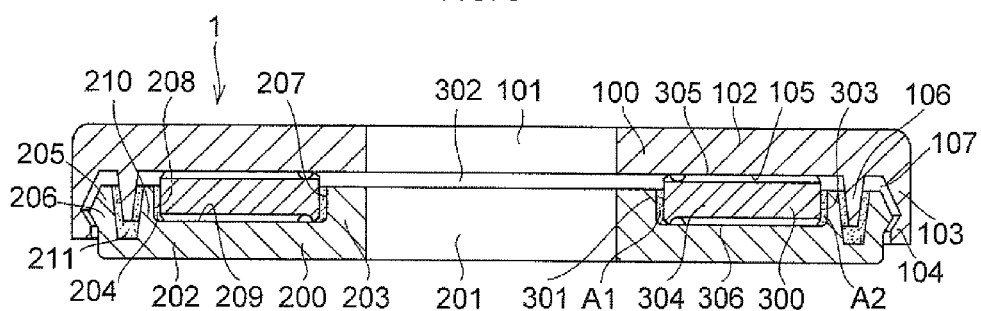
FIG. 3 is a cross-sectional view of a preferred second embodiment of the invention.

FIG. 3 shows the synthetic resin-made thrust sliding bearing 1 in accordance with a second embodiment. This synthetic resin-made thrust sliding bearing 1 is comprised of the synthetic resin-made upper casing 100, the synthetic resin-made lower casing 200, and the synthetic resin-made thrust bearing piece 300 interposed between the upper and lower casings 100 and 200.

The upper casing 100 includes the upper annular flat plate-shaped portion 102 having the circular hole 101 in its central portion; a cylindrical suspended portion 106 formed integrally on the lower surface 105 of the upper annular flat plate-shaped portion 102 in such a manner as to be radially outwardly spaced apart a predetermined interval from the peripheral edge of the circular hole 101; the cylindrical engaging suspended portion 103 formed integrally on the outer peripheral edge of the upper annular flat plate-shaped portion 102 in such a manner as to be radially outwardly spaced apart a predetermined interval from the cylindrical suspended portion 106, so as to form an upper outer annular groove 107 in cooperation with the cylindrical suspended portion 106; and the engaging portion 104 formed on the inner peripheral surface of the end portion of the cylindrical engaging suspended portion 103.

The lower casing 200 includes the lower annular flat plate-shaped portion 202 having in its central portion the insertion hole 201 communicating with the circular hole 101; the annular projection 203 having an inside diameter identical to that of the insertion hole 201 and formed integrally on the upper surface 209 of the lower annular flat plate-shaped portion 202; an annular projection 210 formed integrally on the upper surface 209 of the lower annular flat plate-shaped portion 202 in such a manner as to be radially outwardly spaced apart a predetermined interval from the annular projection 203, so as to form the lower annular recess 204 in cooperation with the annular projection 203 and the upper surface 209 of the lower annular flat plate-shaped portion 202; the annular engaging projection 205 formed integrally on the outer peripheral edge of the lower annular flat plate-shaped portion 202 in such a manner as to be radially outwardly spaced apart a predetermined interval from the annular projection 210, so as to form a lower outer annular groove 211 in cooperation with the annular projection 210; and the engaged portion 206 formed on an outer peripheral surface of the end portion of the annular engaging projection 205.

The thrust bearing piece 300 is constituted by the disk 304 which has the circular hole 302 defined by the inner peripheral surface 301 having an inside diameter larger than the outside diameter of the annular projection 203 of the lower casing 200 and has the outer peripheral surface 303 having an outside diameter smaller than the inside diameter of the annular projection 210. The thrust bearing piece 300 is disposed in the lower annular recess 204 while maintaining the annular clearances A1 and A2 between its inner peripheral surface 301 and the outer peripheral surface 207 of the annular projection 203 and between its outer peripheral surface 303 and the inner peripheral surface 208 of the annular projection 210, respectively. Further, the thrust bearing piece 300 is disposed between the upper and lower casings 100 and 200 such that its upper surface 305 is positioned above the opening of the lower annular recess 204 and is brought into sliding contact with the lower surface 105 of the upper annular flat plate-shaped portion 101, while its lower surface 306 is brought into sliding contact with the upper surface 209 of the lower annular recess 204 defining the bottom surface of the lower annular recess 204.

The upper casing 100 is combined with the lower casing 200 by disposing the end portion of the cylindrical suspended portion 106 in the lower outer annular groove 211 so as to be radially superposed on the end portions of the annular projection 210 and the annular engaging projection 205, respectively, and by causing the engaging portion 104 to be resiliently fitted to the engaged portion 206.

In the synthetic resin-made thrust sliding bearing 1 in accordance with the second embodiment, a silicone grease whose base oil is a silicone oil, whose coefficient of kinematic viscosity at 25° C. is not less than 100 cSt and not more than 500,000 cSt, preferably not less than 1,000 cSt and not more than 100,000 cSt, and which contains a thickener so as to set its worked penetration to not less than 200 and not more than 400, preferably not less than 250 and not more than 350, is interposed at sliding interfaces between, on the one hand, the lower surface 105 of the upper annular flat plate-shaped portion 102 and the upper surface 209 of the lower annular flat plate-shaped portion 202 defining the bottom surface of the lower annular recess 204, and, on the other hand, the upper and lower surfaces 305 and 306 of the thrust bearing piece 300 which are respectively brought into sliding contact therewith by being disposed in the lower annular recess 204. Also, an equivalent silicone grease is filled and held in each of the annular clearances A1 and A2 and the lower outer annular groove 211.

The silicone grease is thus interposed at the sliding interfaces between, on the one hand, the lower surface 105 of the upper annular flat plate-shaped portion 102 and the upper surface 209 of the lower annular flat plate-shaped portion 202 defining the bottom surface of the lower annular recess 204, and, on the other hand, the upper and lower surfaces 305 and 306 of the thrust bearing piece 300 which are respectively brought into sliding contact therewith by being disposed in the lower annular recess 204. In consequence, low friction characteristics are exhibited to enable smooth sliding, and the stick-slip phenomenon does not occur during sliding, so that abnormal frictional noise attributable to the stick-slip phenomenon is not generated. In addition, as the silicone grease is filled and held in the annular clearances A1 and A2, the silicone grease is constantly supplied to the sliding interface between the lower surface 306 of the thrust bearing piece 300 and the upper surface 209 of the lower annular flat plate-shaped portion 202 defining the bottom surface of the lower annular recess 204, so that low friction characteristics are exhibited over extended periods of time to enable smooth sliding without the occurrence of such as depletion of the silicone grease between the sliding surfaces.

In the synthetic resin-made thrust sliding bearing 1 in accordance with the second embodiment, the upper casing 100 is combined with the lower casing 200 by disposing the end portion of the cylindrical suspended portion 106 in the lower outer annular groove 211 so as to be radially superposed on the end portions of the annular projection 210 and the annular engaging projection 205, respectively, and by causing the engaging portion 104 to be resiliently fitted to the engaged portion 206. In consequence, sealed portions based on labyrinth action are formed at the superposed portions of the cylindrical suspended portion 106 and the annular projection 210 and the annular engaging projection 205 and at the resiliently fitting portions of the engaging portion 104 and the engaged portion 206. In addition, silicone grease is filled and held in the lower outer annular groove 211 formed on the outer diameter side of the lower casing 200. Therefore, foreign objects such as dust which entered from the resiliently fitting portions of the engaging portion 104 and the engaged portion 206 are captured by the silicone grease filled and held in that lower outer annular groove 211, and are thereby prevented from entering the sliding interface. Hence, a dual entry prevention effect is exhibited with respect to the entry of foreign objects such as dust by virtue of the silicone grease and the sealed portions based on the labyrinth action.

Also with the synthetic resin-made thrust sliding bearing 1 in accordance with the second embodiment, in the same way as the thrust bearing piece 300 of the synthetic resin-made thrust sliding bearing 1 in accordance with the above-described first embodiment, as shown in FIG. 2, the thrust bearing piece 300 should preferably have, on each of its upper and lower surfaces 305 and 306 of the thrust bearing piece 300 constituted by the disk 304, the annular groove 307 which surrounds the circular hole 302, as well as the radial grooves 308 each having one end open at the annular groove 307 and the other end open at the outer peripheral surface 303 of the thrust bearing piece 300 constituted by the disk 304 and arranged at equal intervals in the circumferential direction. A silicone grease equivalent to the above-described silicone grease is filled and held in these annular grooves 307 and radial grooves 308.

Also with the synthetic resin-made thrust sliding bearing 1 in accordance with the second embodiment, as for the upper casing 100 and the lower casing 200, in the same way as the upper casing 100 and the lower casing 200 of the synthetic resin-made thrust sliding bearing 1 in accordance with the above-described first embodiment, a thermoplastic synthetic resin such as polyacetal resin, polyamide resin, and polyester resin is suitably used. In addition, as the resin for forming the thrust bearing piece 300, a thermoplastic synthetic resin such as polyacetal resin, polyamide resin, polyolefin resin, and polyester resin, which excel in the sliding characteristics with respect to the thermoplastic synthetic resin for forming the upper and lower casings 100 and 200, is suitably used.

Figure 4:
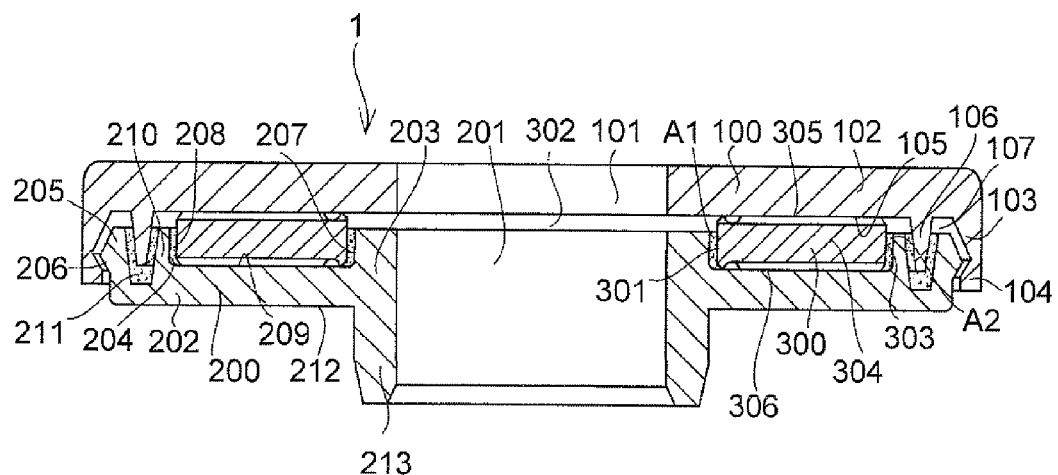
FIG. 4 is a cross-sectional view of a preferred third embodiment of the invention.

FIG. 4 shows the synthetic resin-made thrust sliding bearing 1 in accordance with a third embodiment. This synthetic resin-made thrust sliding bearing 1 has, in addition to the construction of the synthetic resin-made thrust sliding bearing 1 in accordance with the above-described second embodiment, a cylindrical portion 213 which has an inside diameter identical to that of the insertion hole 201 and is formed integrally with a lower surface 212 of the lower annular flat plate-shaped portion 202.

Figure 5:
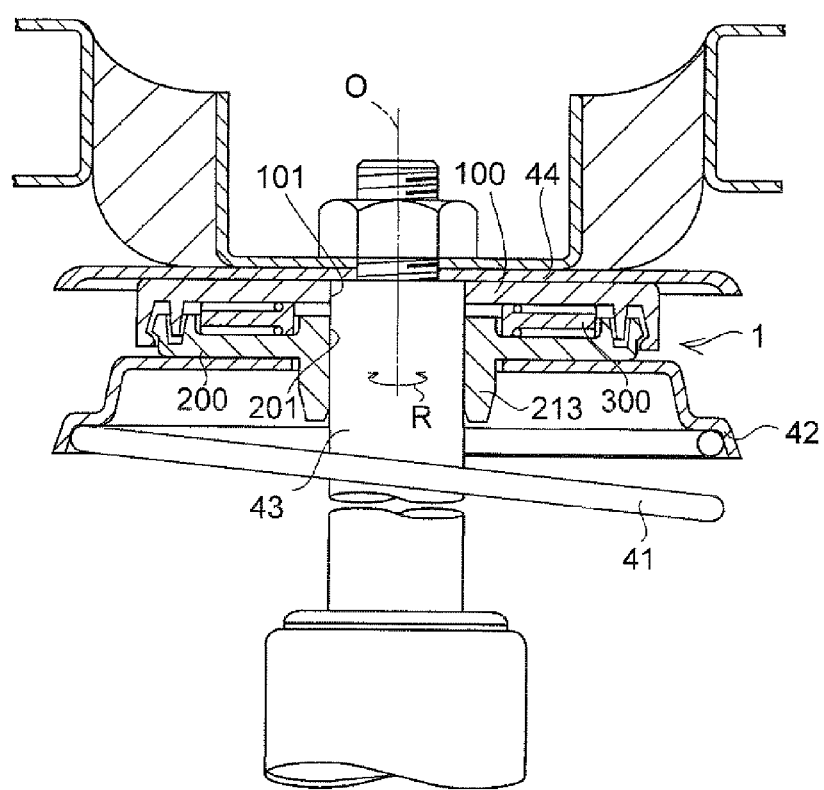
FIG. 5 is a cross-sectional view of an example in which the embodiment shown in FIG. 4 is incorporated in a strut-type suspension.

With the synthetic resin-made thrust sliding bearing 1 in accordance with the third embodiment having the cylindrical portion 213 on the lower surface 212 of the lower annular flat plate-shaped portion 202, when it is installed between an upper spring seat 42 of a coil spring 41 and a mounting member 44 to which a piston rod 43 of a hydraulic damper is secured in a strut-type suspension assembly shown in FIG. 5, the positioning is facilitated, and its installation is facilitated.

In this case, an upper portion of the piston rod 43 is inserted into the circular hole 101 of the upper casing 100 and the insertion hole 201 of the lower casing 200 in the synthetic resin-made thrust sliding bearing 1 such as to be swingingly rotatable about an axis O in an R direction with respect to the upper casing 100 and the lower casing 200.

With the strut-type suspension assembly installed by means of the synthetic resin-made thrust sliding bearing 1, as shown in FIG. 5, at the time of steering operation, the relative swinging rotation of the upper spring seat 42 about the axis O in the R direction by means of the coil spring 41 is effected smoothly by the relative swinging rotation of the lower casing 200 in the same direction relative to the upper casing 100.

Figure 6:
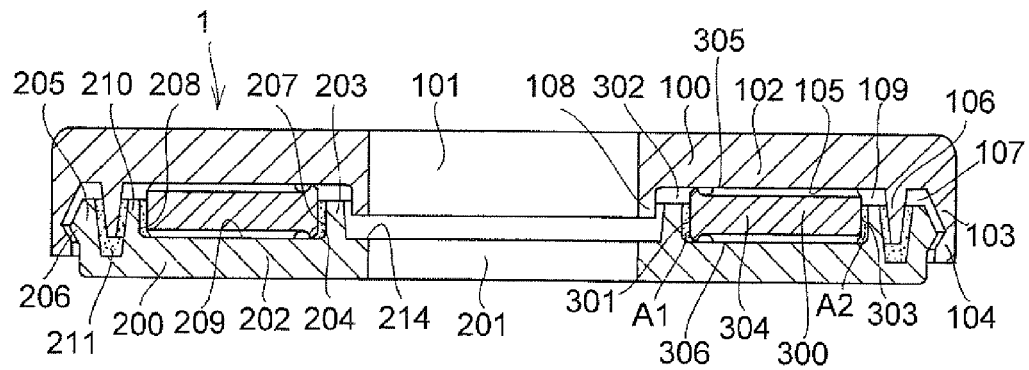
FIG. 6 is a cross-sectional view of a preferred fourth embodiment of the invention.

FIG. 6 shows the synthetic resin-made thrust sliding bearing 1 in accordance with a fourth embodiment. This synthetic resin-made thrust sliding bearing 1 is comprised of the synthetic resin-made upper casing 100, the synthetic resin-made lower casing 200, and the synthetic resin-made thrust bearing piece 300 interposed between the upper and lower casings 100 and 200.

The upper casing 100 includes the upper annular flat plate-shaped portion 102 having the circular hole 101 in its central portion; a cylindrical suspended portion 108 formed integrally on the lower surface 105 of the upper annular flat plate-shaped portion 102 and having an inside diameter identical to the diameter of the circular hole 101; a cylindrical suspended portion 106 formed integrally on the lower surface 105 of the upper annular flat plate-shaped portion 102 in such a manner as to be radially outwardly spaced apart a predetermined interval from an outer peripheral surface of the cylindrical suspended portion 108, so as to form an upper annular recess 109 in cooperation with the cylindrical suspended portion 108 and the lower surface 105 of the upper annular flat plate-shaped portion 102; the cylindrical engaging suspended portion 103 formed integrally on the outer peripheral edge of the upper annular flat plate-shaped portion 102 in such a manner as to be radially outwardly spaced apart a predetermined interval from the cylindrical suspended portion 106, so as to form the upper outer annular groove 107 in cooperation with the cylindrical suspended portion 106; and the engaging portion 104 formed on the inner peripheral surface of the end portion of the cylindrical engaging suspended portion 103.

The lower casing 200 includes the lower annular flat plate-shaped portion 202 having in its central portion the insertion hole 201 communicating with the circular hole 101; the annular projection 203 formed integrally on the upper surface 209 of the lower annular flat plate-shaped portion 202 in such a manner as to be radially outwardly spaced apart from the insertion hole 201 via an annular shoulder portion 214; the annular projection 210 formed integrally on the upper surface 209 of the lower annular flat plate-shaped portion 202 in such a manner as to be radially outwardly spaced apart a predetermined interval from the annular projection 203, so as to form the lower annular recess 204 in cooperation with the annular projection 203 and the upper surface 209 of the lower annular flat plate-shaped portion 202; the annular engaging projection 205 formed integrally on the outer peripheral edge of the lower annular flat plate-shaped portion 202 in such a manner as to be radially outwardly spaced apart a predetermined interval from the outer peripheral surface of the annular projection 210, so as to form the lower outer annular groove 211 in cooperation with the annular projection 210 and the upper surface 209 of the lower annular flat plate-shaped portion 202; and the engaged portion 206 formed on the outer peripheral surface of the end portion of the annular engaging projection 205.

The thrust bearing piece 300 is constituted by the disk 304 which has the circular hole 302 defined by the inner peripheral surface 301 having an inside diameter larger than the outside diameter of the annular projection 203 and has the outer peripheral surface 303 having an outside diameter smaller than the inside diameter of the annular projection 210. The thrust bearing piece 300 is disposed in the lower annular recess 204 while maintaining the annular clearances A1 and A2 between its inner peripheral surface 301 and the outer peripheral surface 207 of the annular projection 203 and between its outer peripheral surface 303 and the inner peripheral surface 208 of the annular projection 210, respectively. Further, the thrust bearing piece 300 is disposed between the upper and lower casings 100 and 200 such that its upper surface 305 is disposed above the opening of the lower annular recess 204 and is brought into sliding contact with the lower surface 105 of the upper annular flat plate-shaped portion 102, while its lower surface 306 is brought into sliding contact with the upper surface 209 of the lower annular flat plate-shaped portion 202 defining the bottom surface of the lower annular recess 204.

The upper casing 100 is combined with the lower casing by causing the end portion of the cylindrical suspended portion 108 to face the annular shoulder portion 214 and to be radially superposed on the end portion of the annular projection 203, by disposing the end portion of the cylindrical suspended portion 106 in the lower outer annular groove 211 so as to be radially superposed on the end portions of the annular projection 210 and the annular engaging projection 205, respectively, and by causing the engaging portion 104 to be resiliently fitted to the engaged portion 206.

In the synthetic resin-made thrust sliding bearing 1 in accordance with the fourth embodiment, a silicone grease whose base oil is a silicone oil, whose coefficient of kinematic viscosity at 25° C. is not less than 500 cSt and not more than 500,000 cSt, preferably not less than 1,000 cSt and not more than 100,000 cSt, and which contains a thickener so as to set its worked penetration to not less than 200 and not more than 400, preferably not less than 250 and not more than 350, is interposed at sliding interfaces between, on the one hand, the lower surface 105 of the upper annular flat plate-shaped portion 102 and the upper surface 209 of the lower annular flat plate-shaped portion 202 defining the bottom surface of the lower annular recess 204, and, on the other hand, the upper and lower surfaces 305 and 306 of the thrust bearing piece 300 which are respectively brought into sliding contact therewith by being disposed in the lower annular recess 204 of the lower casing 200. Also, an equivalent silicone grease is filled and held in each of the annular clearances A1 and A2 and the outer annular clearance 210.

The silicone grease is thus interposed at the sliding interfaces between, on the one hand, the lower surface 105 of the upper annular flat plate-shaped portion 102 and the upper surface 209 of the lower annular flat plate-shaped portion 202 defining the bottom surface of the lower annular recess 204, and, on the other hand, the upper and lower surfaces 305 and 306 of the thrust bearing piece 300 which are respectively brought into sliding contact therewith by being disposed in the lower annular recess 204. In consequence, low friction characteristics are exhibited to enable smooth sliding, and the stick-slip phenomenon does not occur during sliding, so that abnormal frictional noise attributable to the stick-slip phenomenon is not generated. In addition, as the silicone grease is filled and held in the annular clearances A1 and A2, the silicone grease is constantly supplied to the sliding interface between the lower surface 306 of the thrust bearing piece 300 and the upper surface 209 of the lower annular flat plate-shaped portion 202 defining the bottom surface of the lower annular recess 204, so that low friction characteristics are exhibited over extended periods of time to enable smooth sliding without the occurrence of such as depletion of the silicone grease between the sliding surfaces.

In the synthetic resin-made thrust sliding bearing 1 in accordance with the fourth embodiment, the upper casing 100 is combined with the lower casing 200 by causing the end portion of the cylindrical suspended portion 108 to face the annular shoulder portion 214 and to be radially superposed on the end portion of the annular projection 203, by disposing the end portion of the cylindrical suspended portion 106 in the lower outer annular groove 211 so as to be radially superposed on the end portions of the annular projection 210 and the annular engaging projection 205, respectively, and by causing the engaging portion 104 to be resiliently fitted to the engaged portion 206. In consequence, a sealed portion based on the labyrinth action is formed on the inner peripheral surface side of the synthetic resin-made thrust sliding bearing 1 at the superposed portions of the cylindrical suspended portion 108 and the annular projection 203, and sealed portions based on the labyrinth action are formed on the outer peripheral surface side at the superposed portions of the cylindrical suspended portion 106 and the annular projection 210 and the annular engaging projection 205 and at the resiliently fitting portions of the engaging portion 104 and the engaged portion 206, respectively. In addition, silicone grease is filled and held in the lower outer annular groove 211. Therefore, foreign objects such as dust which entered from the resiliently fitting portions of the engaging portion 104 and the engaged portion 206 are captured by the silicone grease filled and held in that lower outer annular groove 211, and are thereby prevented from entering the sliding interfaces. Hence, a dual prevention effect is exhibited on the outer diameter side with respect to the entry of foreign objects such as dust by virtue of the silicone grease and the sealed portions based on the labyrinth action.

Also with the synthetic resin-made thrust sliding bearing 1 in accordance with the fourth embodiment, in the same way as the thrust bearing piece 300 of the synthetic resin-made thrust sliding bearing 1 in accordance with the above-described first embodiment, as shown in FIG. 2, the thrust bearing piece 300 should preferably have, on each of its upper and lower surfaces 305 and 306 of the thrust bearing piece 300 constituted by the disk 304, the annular groove 307 which surrounds the circular hole 302, as well as the radial grooves 308 each having one end open at the annular groove 307 and the other end open at the outer peripheral surface 303 of the thrust bearing piece 300 constituted by the disk 304 and arranged at equal intervals in the circumferential direction. A silicone grease equivalent to the above-described silicone grease is filled and held in these annular grooves 307 and radial grooves 308.

Also with the synthetic resin-made thrust sliding bearing 1 in accordance with the fourth embodiment, as for the upper casing 100 and the lower casing 200, in the same way as the upper casing 100 and the lower casing 200 of the synthetic resin-made thrust sliding bearing 1 in accordance with the above-described first embodiment, a thermoplastic synthetic resin such as polyacetal resin, polyamide resin, and polyester resin is suitably used. In addition, as the resin for forming the thrust bearing piece 300, a thermoplastic synthetic resin such as polyacetal resin, polyamide resin, polyolefin resin, and polyester resin, which excel in the sliding characteristics with respect to the thermoplastic synthetic resin for forming the upper and lower casings 100 and 200, is suitably used.

Figure 7:
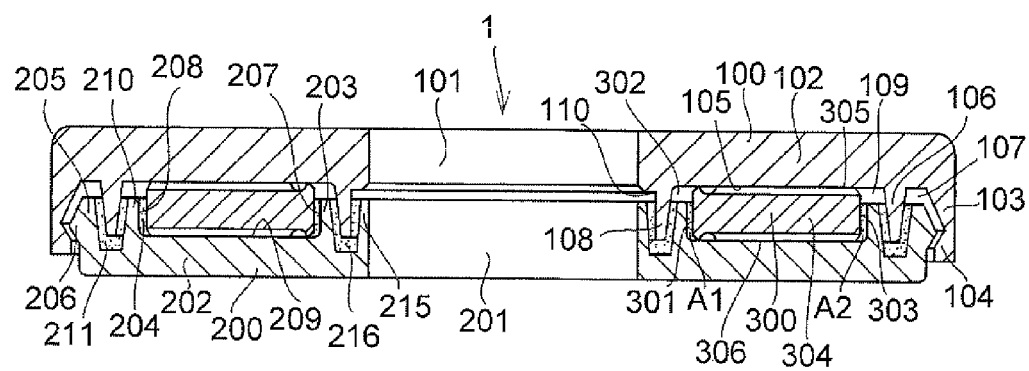
FIG. 7 is a cross-sectional view of a preferred fifth embodiment of the invention.

FIG. 7 shows the synthetic resin-made thrust sliding bearing 1 in accordance with a fifth embodiment. This synthetic resin-made thrust sliding bearing 1 is comprised of the synthetic resin-made upper casing 100, the synthetic resin-made lower casing 200, and the synthetic resin-made thrust bearing piece 300 interposed between the upper and lower casings 100 and 200.

The upper casing 100 includes the upper annular flat plate-shaped portion 102 having the circular hole 101 in its central portion; the cylindrical suspended portion 108 formed integrally on the lower surface 105 of the upper annular flat plate-shaped portion 102 in such a manner as to be radially outwardly spaced apart from the circular hole 101 via the annular shoulder portion 110; the cylindrical suspended portion 106 formed integrally on the lower surface 105 of the upper annular flat plate-shaped portion 102 in such a manner as to be radially outwardly spaced apart a predetermined interval from the cylindrical suspended portion 108, so as to form an upper annular recess 109 in cooperation with the cylindrical suspended portion 108 and the lower surface 105 of the upper annular flat plate-shaped portion 102; the cylindrical engaging suspended portion 103 formed integrally on the outer peripheral edge of the upper annular flat plate-shaped portion 102 in such a manner as to be radially outwardly spaced apart a predetermined interval from the cylindrical suspended portion 106, so as to form the upper outer annular groove 107 in cooperation with the cylindrical suspended portion 106; and the engaging portion 104 formed on the inner peripheral surface of the end portion of the cylindrical engaging suspended portion 103.

The lower casing 200 includes the lower annular flat plate-shaped portion 202 having in its central portion the insertion hole 201 communicating with the circular hole 101; an annular projection 215 formed integrally on the lower annular flat plate-shaped portion 202 and having an inside diameter identical to that of the insertion hole 201; the annular projection 203 formed integrally on the upper surface 209 of the lower annular flat plate-shaped portion 202 in such a manner as to be radially outwardly spaced apart a predetermined interval from the annular projection 215, so as to form a lower inner annular groove 216 in cooperation with the annular projection 215; the annular projection 210 formed integrally on the upper surface 209 of the lower annular flat plate-shaped portion 202 in such a manner as to be radially outwardly spaced apart a predetermined interval from the annular projection 203, so as to form the lower annular recess 204 in cooperation with the annular projection 203 and the upper surface 209 of the lower annular flat plate-shaped portion 202; the annular engaging projection 205 formed integrally on the outer peripheral edge of the lower annular flat plate-shaped portion 202 in such a manner as to be radially outwardly spaced apart a predetermined interval from the annular projection 210, so as to form the lower outer annular groove 211 in cooperation with the annular projection 210; and the engaged portion 206 formed on the outer peripheral surface of the end portion of the annular engaging projection 205.

The thrust bearing piece 300 is constituted by the disk 304 which has the circular hole 302 defined by the inner peripheral surface 301 having an inside diameter larger than the outside diameter of the annular projection 203 and has the outer peripheral surface 303 having an outside diameter smaller than the inside diameter of the annular projection 210. The thrust bearing piece 300 is disposed in the lower annular recess 204 while maintaining the annular clearances A1 and A2 between its inner peripheral surface 301 and the outer peripheral surface 207 of the annular projection 203 and between its outer peripheral surface 303 and the inner peripheral surface 208 of the annular projection 210, respectively. Further, the thrust bearing piece 300 is disposed between the upper and lower casings 100 and 200 such that its upper surface 305 is disposed above the opening of the lower annular recess 204 and is brought into sliding contact with the lower surface 105 of the upper annular flat plate-shaped portion 102, while its lower surface 306 is brought into sliding contact with the upper surface 209 of the lower annular flat plate-shaped portion 202 defining the bottom surface of the lower annular recess 204.

The upper casing 100 is combined with the lower casing 200 by disposing the end portion of the cylindrical suspended portion 108 in the lower inner annular groove 216 so as to be radially superposed on the end portions of the annular projection 215 and the annular projection 203, by disposing the end portion of the cylindrical suspended portion 106 in the lower outer annular groove 211 so as to be radially superposed on the end portions of the annular projection 210 and the annular engaging projection 205, respectively, and by causing the engaging portion 104 to be resiliently fitted to the engaged portion 206.

In the synthetic resin-made thrust sliding bearing 1 in accordance with the fifth embodiment, a silicone grease whose base oil is a silicone oil, whose coefficient of kinematic viscosity at 25° C. is not less than 500 cSt and not more than 500,000 cSt, preferably not less than 1,000 cSt and not more than 100,000 cSt, and which contains a thickener so as to set its worked penetration to not less than 200 and not more than 400, preferably not less than 250 and not more than 350, is interposed at sliding interfaces between, on the one hand, the lower surface 105 of the upper annular flat plate-shaped portion 102 and the upper surface 209 of the lower annular flat plate-shaped portion 202 defining the bottom surface of the lower annular recess 204, and, on the other hand, the upper and lower surfaces 305 and 306 of the thrust bearing piece 300 which are respectively brought into sliding contact therewith by being disposed in the lower annular recess 204 of the lower casing 200. Also, an equivalent silicone grease is filled and held in the annular clearances A1 and A2 and the inner and outer annular clearances 216 and 211, respectively.

The silicone grease is thus interposed at the sliding interfaces between, on the one hand, the lower surface 105 of the upper annular flat plate-shaped portion 102 and the upper surface 209 of the lower annular flat plate-shaped portion 202 defining the bottom surface of the lower annular recess 204, and, on the other hand, the upper and lower surfaces 305 and 306 of the thrust bearing piece 300 which are respectively brought into sliding contact therewith by being disposed in the lower annular recess 204. In consequence, low friction characteristics are exhibited to enable smooth sliding, and the stick-slip phenomenon does not occur during sliding, so that abnormal frictional noise attributable to the stick-slip phenomenon is not generated. In addition, as the silicone grease is filled and held in the annular clearances A1 and A2, the silicone grease is constantly supplied to the sliding interface between the lower surface 306 of the thrust bearing piece 300 and the upper surface 209 of the lower annular flat plate-shaped portion 202 defining the bottom surface of the lower annular recess 204, so that low friction characteristics are exhibited over extended periods of time to enable smooth sliding without the occurrence of such as depletion of the silicone grease between the sliding surfaces.

In the synthetic resin-made thrust sliding bearing 1 in accordance with the fifth embodiment, the upper casing 100 is combined with the lower casing 200 by disposing the end portion of the cylindrical suspended portion 108 in the lower inner annular groove 216 so as to be radially superposed on the end portions of the annular projection 215 and the annular projection 203, respectively, by disposing the end portion of the cylindrical suspended portion 106 in the lower outer annular groove 211 so as to be radially superposed on the end portions of the annular projection 210 and the annular engaging projection 205, respectively, and by causing the engaging portion 104 to be resiliently fitted to the engaged portion 206. In consequence, sealed portions based on the labyrinth action are formed on the inner peripheral surface side of the synthetic resin-made thrust sliding bearing 1 at the superposed portions of the cylindrical suspended portion 108 and the annular projection 215 and the annular projection 203, and sealed portions based on the labyrinth action are formed on the outer peripheral surface side at the superposed portions of the cylindrical suspended portion 106 and the annular projection 210 and the annular engaging projection 205 and at the resiliently fitting portions of the engaging portion 104 and the engaged portion 206, respectively. In addition, silicone grease is filled and held in the lower inner annular groove 216 fanned on the inner diameter side and in the lower outer annular groove 211 formed on the outer diameter side, respectively. Therefore, foreign objects such as dust which entered from the resiliently fitting portions of the engaging portion 104 and the engaged portion 206 or from the labyrinth portion on the inner diameter side are captured by the silicone grease filled and held in that lower inner annular groove 216 and that lower outer annular groove 211, and are thereby prevented from entering the sliding interfaces. Hence, a dual prevention effect is exhibited on the inner diameter side and the outer diameter side with respect to the entry of foreign objects such as dust by virtue of the silicone grease and the sealed portions based on the labyrinth action.

Also with the synthetic resin-made thrust sliding bearing 1 in accordance with the fifth embodiment, in the same way as the thrust bearing piece 300 of the synthetic resin-made thrust sliding bearing 1 in accordance with the above-described first embodiment, as shown in FIG. 2, the thrust bearing piece 300 should preferably have, on each of its upper and lower surfaces 305 and 306 of the thrust bearing piece 300 constituted by the disk 304, the annular groove 307 which surrounds the circular hole 302, as well as the radial grooves 308 each of which has one end open at the annular groove 307 and the other end open at the outer peripheral surface 303 of the thrust bearing piece 300 constituted by the disk 304, and which are arranged at equal intervals in the circumferential direction. A silicone grease equivalent to the above-described silicone grease is filled and held in these annular grooves 307 and radial grooves 308.

Also with the synthetic resin-made thrust sliding bearing 1 in accordance with the fifth embodiment, as for the upper casing 100 and the lower casing 200, in the same way as the upper casing 100 and the lower casing 200 of the synthetic resin-made thrust sliding bearing 1 in accordance with the above-described first embodiment, a thermoplastic synthetic resin such as polyacetal resin, polyamide resin, and polyester resin is suitably used. In addition, as the resin for forming the thrust bearing piece 300, a thermoplastic synthetic resin such as polyacetal resin, polyamide resin, polyolefin resin, and polyester resin, which excel in the sliding characteristics with respect to the thermoplastic synthetic resin for forming the upper and lower casings 100 and 200, is suitably used.

Figure 8:
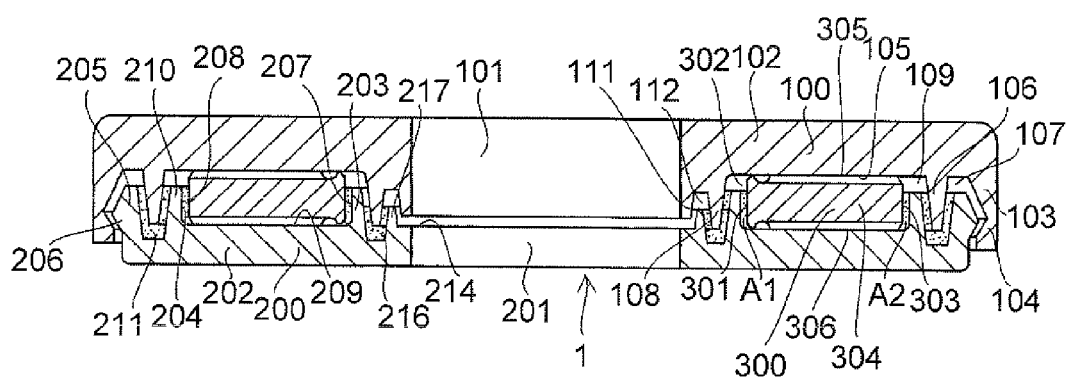
FIG. 8 is a cross-sectional view of a preferred sixth embodiment of the invention.
Figure 9:
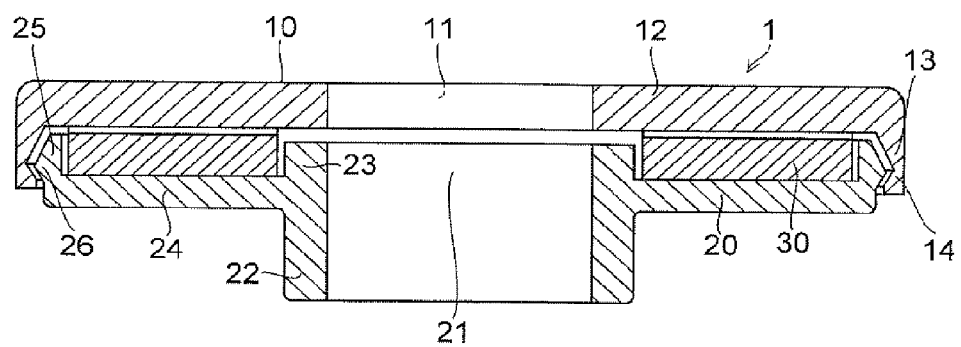
FIG. 9 is a cross-sectional view of a conventional synthetic resin-made thrust sliding bearing.

FIG. 8 shows the synthetic resin-made thrust sliding bearing 1 in accordance with a sixth embodiment. This synthetic resin-made thrust sliding bearing 1 is comprised of the synthetic resin-made upper casing 100, the synthetic resin-made lower casing 200, and the synthetic resin-made thrust bearing piece 300 interposed between the upper and lower casings 100 and 200.

The upper casing 100 includes the upper annular flat plate-shaped portion 102 having the circular hole 101 in its central portion; a cylindrical suspended portion 111 formed integrally on the lower surface 105 of the upper annular flat plate-shaped portion 102 and having an inside diameter identical to that of the circular hole 101; the cylindrical suspended portion 108 formed integrally on the lower surface 105 of the upper annular flat plate-shaped portion 102 in such a manner as to be radially outwardly spaced apart a predetermined interval from the cylindrical suspended portion 111, so as to form an upper inner annular groove 112 in cooperation with an outer peripheral surface of the cylindrical suspended portion 111; the cylindrical suspended portion 106 formed integrally on the lower surface 105 of the upper annular flat plate-shaped portion 102 in such a manner as to be radially outwardly spaced apart a predetermined interval from the cylindrical suspended portion 108, so as to form the upper annular recess 109 in cooperation with the cylindrical suspended portion 108 and the lower surface 105 of the upper annular flat plate-shaped portion 102; the cylindrical engaging suspended portion 103 formed integrally on the outer peripheral edge of the upper annular flat plate-shaped portion 102 in such a manner as to be radially outwardly spaced apart a predetermined interval from the cylindrical suspended portion 106, so as to form the upper outer annular groove 107 in cooperation with the cylindrical suspended portion 106; and the engaging portion 104 formed on the inner peripheral surface of the end portion of the cylindrical engaging suspended portion 103.

The lower casing 200 includes the lower annular flat plate-shaped portion 202 having in its central portion the insertion hole 201 communicating with the circular hole 101; an annular projection 217 formed integrally on the upper surface 209 of the lower annular flat plate-shaped portion 202 in such a manner as to be radially outwardly spaced apart from the insertion hole 201 via the annular shoulder portion 214; the annular projection 203 formed integrally on the upper surface 209 of the lower annular flat plate-shaped portion 202 in such a manner as to be radially outwardly spaced apart a predetermined interval from the annular projection 217, so as to form the lower inner annular groove 216 in cooperation with the annular projection 217; the annular projection 210 formed integrally on the upper surface 209 of the lower annular flat plate-shaped portion 202 in such a manner as to be radially outwardly spaced apart a predetermined interval from the annular projection 203, so as to form the lower annular recess 204 in cooperation with the annular projection 203 and the upper surface 209 of the lower annular flat plate-shaped portion 202; the annular engaging projection 205 formed integrally on the outer peripheral edge of the lower annular flat plate-shaped portion 202 in such a manner as to be radially outwardly spaced apart a predetermined interval from the annular projection 210, so as to form the lower outer annular groove 211 in cooperation with the annular projection 210; and the engaged portion 206 formed on the outer peripheral surface of the end portion of the annular engaging projection 205.

The thrust bearing piece 300 is constituted by the disk 304 which has the circular hole 302 defined by the inner peripheral surface 301 having an inside diameter larger than the outside diameter of the annular projection 203 and has the outer peripheral surface 303 having an outside diameter smaller than the inside diameter of the annular projection 210. The thrust bearing piece 300 is disposed in the lower annular recess 204 while maintaining the annular clearances A1 and A2 between its inner peripheral surface 301 and the outer peripheral surface 207 of the annular projection 203 and between its outer peripheral surface 303 and the inner peripheral surface 208 of the annular projection 210, respectively. Further, the thrust bearing piece 300 is disposed between the upper and lower casings 100 and 200 such that its upper surface 305 is disposed above the opening of the lower annular recess 204 and is brought into sliding contact with the lower surface 105 of the upper annular flat plate-shaped portion 102, while its lower surface 306 is brought into sliding contact with the upper surface 209 of the lower annular flat plate-shaped portion 202 defining the bottom surface of the lower annular recess 204.

The upper casing 100 is combined with the lower casing 200 by causing the end portion of the cylindrical suspended portion 111 to face the annular shoulder portion 214 and to be superposed on the end portion of the annular projection 217, by disposing the end portion of the cylindrical suspended portion 108 in the lower inner annular groove 216 so as to be radially superposed on the end portions of the annular projection 217 and the annular projection 203, respectively, by disposing the end portion of the cylindrical suspended portion 106 in the lower outer annular groove 211 so as to be radially superposed on the end portions of the annular projection 210 and the annular engaging projection 205, respectively, and by causing the engaging portion 104 to be resiliently fitted to the engaged portion 206.

In the synthetic resin-made thrust sliding bearing 1 in accordance with the sixth embodiment, a silicone grease whose base oil is a silicone oil, whose coefficient of kinematic viscosity at 25° C. is not less than 500 cSt and not more than 500,000 cSt, preferably not less than 1,000 cSt and not more than 100,000 cSt, and which contains a thickener so as to set its worked penetration to not less than 200 and not more than 400, preferably not less than 250 and not more than 350, is interposed at sliding interfaces between, on the one hand, the lower surface 105 of the upper annular flat plate-shaped portion 102 and the upper surface 209 of the lower annular flat plate-shaped portion 202 defining the bottom surface of the lower annular recess 204, and, on the other hand, the upper and lower surfaces 305 and 306 of the thrust bearing piece 300 which are respectively brought into sliding contact therewith by being disposed in the lower annular recess 204 of the lower casing 200. Also, an equivalent silicone grease is filled and held in the annular clearances A1 and A2 and the inner and outer annular clearances 216 and 211, respectively.

The silicone grease is thus interposed at the sliding interfaces between, on the one hand, the lower surface 105 of the upper annular flat plate-shaped portion 102 and the upper surface 209 of the lower annular flat plate-shaped portion 202 defining the bottom surface of the lower annular recess 204, and, on the other hand, the upper and lower surfaces 305 and 306 of the thrust bearing piece 300 which are respectively brought into sliding contact therewith by being disposed in the lower annular recess 204. In consequence, low friction characteristics are exhibited to enable smooth sliding, and the stick-slip phenomenon does not occur during sliding, so that abnormal frictional noise attributable to the stick-slip phenomenon is not generated. In addition, as the silicone grease is filled and held in the annular clearances A1 and A2, the silicone grease is constantly supplied to the sliding interface between the lower surface 306 of the thrust bearing piece 300 and the upper surface 209 of the lower annular flat plate-shaped portion 202 defining the bottom surface of the lower annular recess 204, so that low friction characteristics are exhibited over extended periods of time to enable smooth sliding without the occurrence of such as depletion of the silicone grease between the sliding surfaces.

In the synthetic resin-made thrust sliding bearing 1 in accordance with the sixth embodiment, the upper casing 100 is combined with the lower casing 200 by causing the end portion of the cylindrical suspended portion 111 to face the annular shoulder portion 214 and to be radially superposed on the end portion of the annular projection 217, by disposing the end portion of the cylindrical suspended portion 108 in the lower inner annular groove 216 so as to be radially superposed on the end portions of the annular projection 217 and the annular projection 203, respectively, by disposing the end portion of the cylindrical suspended portion 106 in the lower outer annular groove 211 so as to be radially superposed on the end portions of the annular projection 210 and the annular engaging projection 205, respectively, and by causing the engaging portion 104 to be resiliently fitted to the engaged portion 206. In consequence, sealed portions based on the labyrinth action are formed on the inner peripheral surface side of the synthetic resin-made thrust sliding bearing 1 at the superposed portions of the cylindrical suspended portion 111 and the annular projection 217 and at the superposed portions of the cylindrical suspended portion 108 and the annular projection 217 and the annular projection 203. Meanwhile, sealed portions based on the labyrinth action are feinted on the outer peripheral surface side at the superposed portions of the cylindrical suspended portion 106 and the annular projection 210 and the annular engaging projection 205 and at the resiliently fitting portions of the engaging portion 104 and the engaged portion 206, respectively. In addition, silicone grease is filled and held in the lower inner annular groove 216 formed on the inner diameter side and in the lower outer annular groove 211 formed on the outer diameter side, respectively. Therefore, foreign objects such as dust which entered from the resiliently fitting portions of the engaging portion 104 and the engaged portion 206 or from the labyrinth portion on the inner diameter side are captured by the silicone grease filled and held in that lower inner annular groove 216 and that lower outer annular groove 211, and are thereby prevented from entering the sliding interfaces. Hence, a dual prevention effect is exhibited on the inner diameter side and the outer diameter side with respect to the entry of foreign objects such as dust by virtue of the silicone grease and the sealed portions based on the labyrinth action.

Also with the synthetic resin-made thrust sliding bearing 1 in accordance with the sixth embodiment, in the same way as the thrust bearing piece 300 of the synthetic resin-made thrust sliding bearing 1 in accordance with the above-described first embodiment, as shown in FIG. 2, the thrust bearing piece 300 should preferably have, on each of its upper and lower surfaces 305 and 306 of the thrust bearing piece 300 constituted by the disk 304, the annular groove 307 which surrounds the circular hole 302, as well as the radial grooves 308 each of which has one end open at the annular groove 307 and the other end open at the outer peripheral surface 303 of the thrust bearing piece 300 constituted by the disk 304, and which are arranged at equal intervals in the circumferential direction. A silicone grease equivalent to the above-described silicone grease is filled and held in these annular grooves 307 and radial grooves 308.

Also with the synthetic resin-made thrust sliding bearing 1 in accordance with the sixth embodiment, as for the upper casing 100 and the lower casing 200, in the same way as the upper casing 100 and the lower casing 200 of the synthetic resin-made thrust sliding bearing 1 in accordance with the above-described first embodiment, a thermoplastic synthetic resin such as polyacetal resin, polyamide resin, and polyester resin is suitably used. In addition, as the resin for forming the thrust bearing piece 300, a thermoplastic synthetic resin such as polyacetal resin, polyamide resin, polyolefin resin, and polyester resin, which excel in the sliding characteristics with respect to the thermoplastic synthetic resin for forming the upper and lower casings 100 and 200, is suitably used.

In the same way as the synthetic resin-made thrust sliding bearing 1 in accordance with the third embodiment, each of the synthetic resin-made thrust sliding bearings 1 in accordance with the above-described first, fourth, and fifth embodiments may have, in addition to the above-described construction, the cylindrical portion 213 formed integrally on the lower surface 212 of the lower annular flat plate-shaped portion 202 and having an inside diameter identical to that of the insertion hole 201.

As described above, the synthetic resin-made thrust sliding bearing in accordance with the present invention is comprised of the synthetic resin-made upper casing 100, the synthetic resin-made lower casing 200, and the synthetic resin-made thrust bearing piece 300 interposed between the upper and lower casings 100 and 200. A silicone grease whose base oil is a silicone oil, whose coefficient of kinematic viscosity at 25° C. is not less than 100 cSt and not more than 500,000 cSt (not less than 100 mm$^2$/s and not more than 500,000 mm$^2$/s), preferably not less than 1,000 cSt and not more than 100,000 cSt (not less than 1,000 mm$^2$/s and not more than 100,000 mm$^2$/s), and which contains a thickener so as to set its worked penetration to not less than 200 and not more than 400, preferably not less than 250 and not more than 350, is interposed at the sliding interfaces between, on the one hand, the upper and lower casings 100 and 200 and, on the other hand, the thrust bearing piece 300 interposed between the upper and lower casings 100 and 200. Therefore, low friction characteristics are exhibited to enable smooth sliding, and the stick-slip phenomenon does not occur during sliding, thereby making it possible to prevent the generation of abnormal frictional noise attributable to that stick-slip phenomenon. In addition, in the case where the aforementioned silicone grease is filled and held in the outer annular groove and the inner annular groove respectively formed on the outer peripheral side or the inner peripheral side and the outer peripheral side of the lower casing 200, foreign objects such as dust which entered from the outside, i.e., from the resiliently fitting portions of the engaging portion of the upper casing 100 and the engaged portion of the lower casing or from the labyrinth portion on the inner diameter side, are captured by that silicone grease and are thereby prevented from entering the sliding interface. Hence, a dual entry prevention effect is exhibited with respect to the entry of foreign objects such as dust onto the sliding interfaces by virtue of the silicone grease and the sealed portions formed on the inner diameter side and the outer diameter side on the basis of the labyrinth action.

The invention claimed is:

1. A synthetic resin-made thrust sliding bearing including:
    a synthetic resin-made upper casing having an upper annular flat plate-shaped portion;
    a synthetic resin-made lower casing having a lower annular flat plate-shaped portion which is superposed on said upper casing so as to be rotatable about an axis of said upper casing and opposes said upper annular flat plate-shaped portion, a first and a second annular projection disposed on said lower annular flat plate-shaped portion concentrically therewith, and a lower annular recess surrounded by said first and said second annular projection; and
    a synthetic resin-made thrust bearing piece constituted by a disk which is disposed in the lower annular recess, is brought into sliding contact with an upper surface of said lower annular flat plate-shaped portion defining a bottom surface of the lower annular recess and a lower surface of said upper annular flat plate-shaped portion, and has a circular hole in a central portion of the synthetic resin-made thrust bearing piece,
    said upper casing being combined with said lower casing by causing an outer peripheral edge of the upper casing to be resiliently fitted to an outer peripheral edge of said lower casing,
    said synthetic resin-made thrust sliding bearing further including a silicone grease that is interposed at sliding interfaces between, on the one hand, the upper surface of said lower annular flat plate-shaped portion defining the bottom surface of the lower annular recess and the lower surface of said upper annular flat plate-shaped portion and, on the other hand, an upper surface and a lower surface of said thrust bearing piece which are respectively brought into sliding contact therewith,
    said silicone grease including a methylphenyl silicone oil as a base oil and 12(OH)StLi as a thickener so as to set a worked penetration of said silicone grease to not less than 258 and not more than 279,
    said methylphenyl silicone oil having a coefficient of kinematic viscosity at 25° C. which is not less than 3,000 cSt and not more than 11,000 cSt.

2. The synthetic resin-made thrust sliding bearing according to claim 1, wherein said upper annular flat plate-shaped portion has a circular hole in a central portion thereof, and said lower annular flat plate-shaped portion has in a central portion thereof an insertion hole communicating with the circular hole of said upper annular flat plate-shaped portion, and wherein said upper casing has a cylindrical engaging suspended portion formed integrally on an outer peripheral edge of said upper annular flat plate-shaped portion and an engaging portion formed on an inner peripheral surface of said cylindrical engaging suspended portion, and said lower casing has an engaged portion formed on an outer peripheral surface of said second annular projection, said first annular projection having an inside diameter identical to that of the insertion hole of said lower annular flat plate-shaped portion and being formed integrally on the upper surface of said lower annular flat plate-shaped portion, said second annular projection being formed integrally on an outer peripheral edge of said lower annular flat plate-shaped portion in such a manner as to be radially outwardly spaced apart by a predetermined interval from said first annular projection, so as to form the lower annular recess in cooperation with said first annular projection and the upper surface of said lower annular flat plate-shaped portion, said upper casing being combined with said lower casing by causing said engaging portion to be resiliently fitted to said engaged portion.

3. The synthetic resin-made thrust sliding bearing according to claim 2, wherein an inner peripheral surface of said thrust bearing piece defining the circular hole in the central portion thereof has a diameter larger than an outside diameter of said first annular projection, and an outer peripheral surface of said thrust bearing piece has an outside diameter smaller than an inside diameter of said second annular projection, and wherein said thrust bearing piece is disposed in the lower annular recess with annular clearances provided respectively between the inner peripheral surface defining the circular hole and an outer peripheral surface of said first annular projection and between that outer peripheral surface and an inner peripheral surface of said second annular projection, the silicone grease being filled and held in each of the annular clearances.

4. The synthetic resin-made thrust sliding bearing according to claim 1, wherein said upper annular flat plate-shaped portion has a circular hole in a central portion thereof, and said lower annular flat plate-shaped portion has in a central portion thereof an insertion hole communicating with the circular hole of said upper annular flat plate-shaped portion, wherein said upper casing has a cylindrical suspended portion formed integrally on the lower surface of said upper annular flat plate-shaped portion in such a manner as to be radially outwardly spaced apart by a predetermined interval from a peripheral edge of the circular hole of said upper annular flat plate-shaped portion, a cylindrical engaging suspended portion formed integrally on an outer peripheral edge of said upper annular flat plate-shaped portion in such a manner as to be radially outwardly spaced apart by a predetermined interval from said cylindrical suspended portion, so as to form an upper outer annular groove in cooperation with said cylindrical suspended portion, and an engaging portion formed on an inner peripheral surface of said cylindrical engaging suspended portion, and wherein said lower casing has an annular engaging projection formed integrally on an outer peripheral edge of said lower annular flat plate-shaped portion in such a manner as to be radially outwardly spaced apart by a predetermined interval from said second annular projection, so as to form a lower outer annular groove in cooperation with said second annular projection, and an engaged portion formed on an outer peripheral surface of said annular engaging projection, said first annular projection having an inside diameter identical to that of the insertion hole of said lower annular flat plate-shaped portion and being formed integrally on the upper surface of said lower annular flat plate-shaped portion, said second annular projection being formed integrally on the upper surface of said lower annular flat plate-shaped portion in such a manner as to be radially outwardly spaced apart by a predetermined interval from said first annular projection, so as to form the lower annular recess in cooperation with said first annular projection and the upper surface of said lower annular flat plate-shaped portion, said upper casing being combined with said lower casing by disposing said cylindrical suspended portion in the lower outer annular groove so as to be radially superposed on each of said second annular projection and said annular engaging projection, and by causing said engaging portion to be resiliently fitted to said engaged portion.

5. The synthetic resin-made thrust sliding bearing according to claim 4, wherein an inner peripheral surface of said thrust bearing piece defining the circular hole in a central portion thereof has a diameter larger than an outside diameter of said first annular projection, and an outer peripheral surface of said thrust bearing piece has an outside diameter smaller than an inside diameter of said second annular projection, and wherein said thrust bearing piece is disposed in the lower annular recess with annular clearances provided respectively between the inner peripheral surface defining the circular hole and an outer peripheral surface of said first annular projection and between that outer peripheral surface and an inner peripheral surface of said second annular projection, the silicone grease being filled and held in each of the annular clearances and the lower outer annular groove.

6. The synthetic resin-made thrust sliding bearing according to claim 1, wherein said upper annular flat plate-shaped portion has a circular hole in a central portion thereof, and said lower annular flat plate-shaped portion has in a central portion thereof an insertion hole communicating with the circular hole of said upper annular flat plate-shaped portion, wherein said upper casing has a first cylindrical suspended portion formed integrally on the lower surface of said upper annular flat plate-shaped portion and having an inside diameter identical to that of the circular hole of said upper annular flat plate-shaped portion, a second cylindrical suspended portion formed integrally on the lower surface of said upper annular flat plate-shaped portion in such a manner as to be radially outwardly spaced apart by a predetermined interval from an outer peripheral surface of said first cylindrical suspended portion, so as to form an upper annular recess in cooperation with said first cylindrical suspended portion and the lower surface of said upper annular flat plate-shaped portion, a cylindrical engaging suspended portion formed integrally on an outer peripheral edge of said upper annular flat plate-shaped portion in such a manner as to be radially outwardly spaced apart by a predetermined interval from said second cylindrical suspended portion, so as to form an upper outer annular groove in cooperation with said second cylindrical suspended portion, and an engaging portion formed on an inner peripheral surface of said cylindrical engaging suspended portion, and wherein said lower casing has an annular engaging projection formed integrally on an outer peripheral edge of said lower annular flat plate-shaped portion in such a manner as to be radially outwardly spaced apart by a predetermined interval from an outer peripheral surface of said second annular projection, so as to form a lower outer annular groove in cooperation with said second annular projection and the upper surface of said lower annular flat plate-shaped portion, and an engaged portion formed on the outer peripheral surface of said annular engaging projection, said first annular projection being formed integrally on the upper surface of said lower annular flat plate-shaped portion in such a manner as to be radially outwardly spaced apart by from the insertion hole of said lower annular flat plate-shaped portion via an annular shoulder portion, said second annular projection being formed integrally on the upper surface of said lower annular flat plate-shaped portion in such a manner as to be radially outwardly spaced apart by a predetermined interval from said first annular projection, so as to form the lower annular recess in cooperation with said first annular projection and the upper surface of said lower annular flat plate-shaped portion, said upper casing being combined with said lower casing by radially superposing said first cylindrical suspended portion on said first annular projection, by disposing said second cylindrical suspended portion in the lower outer annular groove so as to be radially superposed on each of said second annular projection and said annular engaging projection, and by causing said engaging portion to be resiliently fitted to said engaged portion.

7. The synthetic resin-made thrust sliding bearing according to claim 1, wherein said upper annular flat plate-shaped portion has a circular hole in a central portion thereof, and said lower annular flat plate-shaped portion has in a central portion thereof an insertion hole communicating with the circular hole of said upper annular flat plate-shaped portion, wherein said upper casing has a first cylindrical suspended portion formed integrally on the lower surface of said upper annular flat plate-shaped portion via the circular hole of said upper annular flat plate-shaped portion and an annular shoulder portion, a second cylindrical suspended portion formed integrally on the lower surface of said upper annular flat plate-shaped portion in such a manner as to be radially outwardly spaced apart by a predetermined interval from an outer peripheral surface of said first cylindrical suspended portion, so as to form an upper annular recess in cooperation with said first cylindrical suspended portion and the lower surface of said upper annular flat plate-shaped portion, a cylindrical engaging suspended portion formed integrally on an outer peripheral edge of said upper annular flat plate-shaped portion in such a manner as to be radially outwardly spaced apart by a predetermined interval from said second cylindrical suspended portion, so as to form an upper outer annular groove in cooperation with said second cylindrical suspended portion, and an engaging portion formed on an inner peripheral surface of said cylindrical engaging suspended portion, and wherein said lower casing has a third annular projection formed integrally on said lower annular flat plate-shaped portion and having an inside diameter identical to that of the insertion hole, an annular engaging projection formed integrally on an outer peripheral edge of said lower annular flat plate-shaped portion in such a manner as to be radially outwardly spaced apart by a predetermined interval from said second annular projection, so as to form a lower outer annular groove in cooperation with said second annular projection, and an engaged portion formed on the outer peripheral surface of said annular engaging projection, said first annular projection being formed integrally on the upper surface of said lower annular flat plate-shaped portion in such a manner as to be radially outwardly spaced apart by a predetermined interval from said third annular projection, so as to form a lower inner annular groove in cooperation with said third annular projection, said second annular projection being formed integrally on the upper surface of said lower annular flat plate-shaped portion in such a manner as to be radially outwardly spaced apart by a predetermined interval from said first annular projection, so as to form the lower annular recess in cooperation with said first annular projection and the upper surface of said lower annular flat plate-shaped portion, said upper casing being combined with said lower casing by disposing said first cylindrical suspended portion in the lower inner annular groove so as to be radially superposed on said first annular projection and said third annular projection, respectively, by disposing an end portion of said second cylindrical suspended portion in the lower outer annular groove so as to be radially superposed on said second annular projection and said annular engaging projection, respectively, and by causing said engaging portion to be resiliently fitted to said engaged portion.

8. The synthetic resin-made thrust sliding bearing according to claim 7, wherein an inner peripheral surface of said thrust bearing piece defining the circular hole in a central portion thereof has a diameter larger than an outside diameter of said first annular projection, and an outer peripheral surface of said thrust bearing piece has an outside diameter smaller than an inside diameter of said second annular projection, and wherein said thrust bearing piece is disposed in the lower annular recess with annular clearances provided respectively between the inner peripheral surface defining the circular hole and an outer peripheral surface of said first annular projection and between that outer peripheral surface and an inner peripheral surface of said second annular projection, the silicone grease being filled and held in each of the annular clearances, the lower inner annular groove, and the lower outer annular groove.

9. The synthetic resin-made thrust sliding bearing according to claim 1, wherein said upper annular flat plate-shaped portion has a circular hole in a central portion thereof, and said lower annular flat plate-shaped portion has in a central portion thereof an insertion hole communicating with the circular hole of said upper annular flat plate-shaped portion, wherein said upper casing has a first cylindrical suspended portion formed integrally on the lower surface of said upper annular flat plate-shaped portion and having an inside diameter identical to that of the circular hole, a second cylindrical suspended portion formed integrally on the lower surface of said upper annular flat plate-shaped portion in such a manner as to be radially outwardly spaced apart by a predetermined interval from said first cylindrical suspended portion, so as to form an upper inner annular groove in cooperation with said first cylindrical suspended portion, a third cylindrical suspended portion formed integrally on the lower surface of said upper annular flat plate-shaped portion in such a manner as to be radially outwardly spaced apart by a predetermined interval from said second cylindrical suspended portion, so as to form an upper annular recess in cooperation with said second cylindrical suspended portion and the lower surface of said upper annular flat plate-shaped portion, a cylindrical engaging suspended portion formed integrally on an outer peripheral edge of said upper annular flat plate-shaped portion in such a manner as to be radially outwardly spaced apart by a predetermined interval from said third cylindrical suspended portion, so as to form an upper outer annular groove in cooperation with said third cylindrical suspended portion, and an engaging portion formed on an inner peripheral surface of said cylindrical engaging suspended portion, and wherein said lower casing has a third annular projection formed integrally on the upper surface of said lower annular flat plate-shaped portion in such a manner as to be radially outwardly spaced apart by from the insertion hole via an annular shoulder portion, an annular engaging projection formed integrally on an outer peripheral edge of said lower annular flat plate-shaped portion in such a manner as to be radially outwardly spaced apart by a predetermined interval from said second annular projection, so as to form a lower outer annular groove in cooperation with said second annular projection, and an engaged portion formed on the outer peripheral surface of said annular engaging projection, said first annular projection being formed integrally on the upper surface of said lower annular flat plate-shaped portion in such a manner as to be radially outwardly spaced apart by a predetermined interval from said third annular projection, so as to form a lower inner annular groove in cooperation with said third annular projection, said second annular projection being formed integrally on the upper surface of said lower annular flat plate-shaped portion in such a manner as to be radially outwardly spaced apart by a predetermined interval from said first annular projection, so as to form the lower annular recess in cooperation with said first annular projection and the upper surface of said lower annular flat plate-shaped portion, said upper casing being combined with said lower casing by causing said first cylindrical suspended portion to face said annular shoulder portion of said lower casing so as to be radially superposed on an end portion of said third annular projection, by disposing said second cylindrical suspended portion in the lower inner annular groove so as to be radially superposed on said first annular projection and said third annular projection, respectively, by disposing said third cylindrical suspended portion in the lower outer annular groove so as to be radially superposed on said second annular projection and said annular engaging projection, respectively, and by causing said engaging portion to be resiliently fitted to said engaged portion.

10. The synthetic resin-made thrust sliding bearing according to claim 1, wherein said thrust bearing piece has on each of the upper and lower surfaces thereof an annular groove which surrounds the circular hole and a plurality of radial grooves each having one end open at the annular groove and another end open at the outer peripheral surface,
said plurality of radial grooves being arranged in a circumferential direction.

11. The synthetic resin-made thrust sliding bearing according to claim 1, wherein said lower casing has a cylindrical portion formed integrally on the lower surface of said lower annular flat plate-shaped portion and having an inside diameter identical to that of the insertion hole.

12. A synthetic resin-made thrust sliding bearing including:
a synthetic resin-made upper casing having an upper annular flat plate-shaped portion;
a synthetic resin-made lower casing having a lower annular flat plate-shaped portion which is superposed on said upper casing so as to be rotatable about an axis of said upper casing and opposes said upper annular flat plate-shaped portion, a first and a second annular projection disposed on said lower annular flat plate-shaped portion concentrically therewith, and a lower annular recess surrounded by said first and said second annular projection; and
a synthetic resin-made thrust bearing piece constituted by a disk which is disposed in the lower annular recess, is brought into sliding contact with an upper surface of said lower annular flat plate-shaped portion defining a bottom surface of the lower annular recess and a lower surface of said upper annular flat plate-shaped portion, and has a circular hole in a central portion of the synthetic resin-made thrust bearing piece,
said upper casing being combined with said lower casing by causing an outer peripheral edge of the upper casing to be resiliently fitted to an outer peripheral edge of said lower casing,
said synthetic resin-made thrust sliding bearing further including
a silicone grease that is interposed at sliding interfaces between, on the one hand, the upper surface of said lower annular flat plate-shaped portion defining the bottom surface of the lower annular recess and the lower surface of said upper annular flat plate-shaped portion and, on the other hand, an upper surface and a lower surface of said thrust bearing piece which are respectively brought into sliding contact therewith,
said silicone grease including a dimethyl silicone oil as a base oil and a thickener which is selected from PTFE and silica so as to set a worked penetration of said silicone grease to not less than 250 and not more than 300,
said dimethyl silicone oil having a coefficient of kinematic viscosity at 25° C. which is not less than 6,500 cSt and not more than 200,000 cSt.

13. The synthetic resin-made thrust sliding bearing according to claim 12, wherein said upper annular flat plate-shaped portion has a circular hole in a central portion thereof, and said lower annular flat plate-shaped portion has in a central portion thereof an insertion hole communicating with the circular hole of said upper annular flat plate-shaped portion, and wherein said upper casing has a cylindrical engaging suspended portion formed integrally on an outer peripheral edge of said upper annular flat plate-shaped portion and an engaging portion formed on an inner peripheral surface of said cylindrical engaging suspended portion, and said lower casing has an engaged portion formed on an outer peripheral surface of said second annular projection, said first annular projection having an inside diameter identical to that of the insertion hole of said lower annular flat plate-shaped portion and being formed integrally on the upper surface of said lower annular flat plate-shaped portion, said second annular projection being formed integrally on an outer peripheral edge of said lower annular flat plate-shaped portion in such a manner as to be radially outwardly spaced apart by a predetermined interval from said first annular projection, so as to form the lower annular recess in cooperation with said first annular projection and the upper surface of said lower annular flat plate-shaped portion, said upper casing being combined with said lower casing by causing said engaging portion to be resiliently fitted to said engaged portion.

14. The synthetic resin-made thrust sliding bearing according to claim 13, wherein an inner peripheral surface of said thrust bearing piece defining the circular hole in the central portion thereof has a diameter larger than an outside diameter of said first annular projection, and an outer peripheral surface of said thrust bearing piece has an outside diameter smaller than an inside diameter of said second annular projection, and wherein said thrust bearing piece is disposed in the lower annular recess with annular clearances provided respectively between the inner peripheral surface defining the circular hole and an outer peripheral surface of said first annular projection and between that outer peripheral surface and an inner peripheral surface of said second annular projection, the silicone grease being filled and held in each of the annular clearances.

15. The synthetic resin-made thrust sliding bearing according to claim 12, wherein said upper annular flat plate-shaped portion has a circular hole in a central portion thereof, and said lower annular flat plate-shaped portion has in a central portion thereof an insertion hole communicating with the circular hole of said upper annular flat plate-shaped portion, wherein said upper casing has a cylindrical suspended portion formed integrally on the lower surface of said upper annular flat plate-shaped portion in such a manner as to be radially outwardly spaced apart by a predetermined interval from a peripheral edge of the circular hole of said upper annular flat plate-shaped portion, a cylindrical engaging suspended portion formed integrally on an outer peripheral edge of said upper annular flat plate-shaped portion in such a manner as to be radially outwardly spaced apart by a predetermined interval from said cylindrical suspended portion, so as to form an upper outer annular groove in cooperation with said cylindrical suspended portion, and an engaging portion formed on an inner peripheral surface of said cylindrical engaging suspended portion, and wherein said lower casing has an annular engaging projection formed integrally on an outer peripheral edge of said lower annular flat plate-shaped portion in such a manner as to be radially outwardly spaced apart by a predetermined interval from said second annular projection, so as to form a lower outer annular groove in cooperation with said second annular projection, and an engaged portion formed on an outer peripheral surface of said annular engaging projection, said first annular projection having an inside diameter identical to that of the insertion hole of said lower annular flat plate-shaped portion and being formed integrally on the upper surface of said lower annular flat plate-shaped portion, said second annular projection being formed integrally on the upper surface of said lower annular flat plate-shaped portion in such a manner as to be radially outwardly spaced apart by a predetermined interval from said first annular projection, so as to form the lower annular recess in cooperation with said first annular projection and the upper surface of said lower annular flat plate-shaped portion, said upper casing being combined with said lower casing by disposing said cylindrical suspended portion in the lower outer annular groove so as to be radially superposed on each of said second annular projection and said annular engaging projection, and by causing said engaging portion to be resiliently fitted to said engaged portion.

16. The synthetic resin-made thrust sliding bearing according to claim 15, wherein an inner peripheral surface of said thrust bearing piece defining the circular hole in a central portion thereof has a diameter larger than an outside diameter of said first annular projection, and an outer peripheral surface of said thrust bearing piece has an outside diameter smaller than an inside diameter of said second annular projection, and wherein said thrust bearing piece is disposed in the lower annular recess with annular clearances provided respectively between the inner peripheral surface defining the circular hole and an outer peripheral surface of said first annular projection and between that outer peripheral surface and an inner peripheral surface of said second annular projection, the silicone grease being filled and held in each of the annular clearances and the lower outer annular groove.

17. The synthetic resin-made thrust sliding bearing according to claim 12, wherein said upper annular flat plate-shaped portion has a circular hole in a central portion thereof, and said lower annular flat plate-shaped portion has in a central portion thereof an insertion hole communicating with the circular hole of said upper annular flat plate-shaped portion, wherein said upper casing has a first cylindrical suspended portion formed integrally on the lower surface of said upper annular flat plate-shaped portion and having an inside diameter identical to that of the circular hole of said upper annular flat plate-shaped portion, a second cylindrical suspended portion formed integrally on the lower surface of said upper annular flat plate-shaped portion in such a manner as to be radially outwardly spaced apart by a predetermined interval from an outer peripheral surface of said first cylindrical suspended portion, so as to form an upper annular recess in cooperation with said first cylindrical suspended portion and the lower surface of said upper annular flat plate-shaped portion, a cylindrical engaging suspended portion formed integrally on an outer peripheral edge of said upper annular flat plate-shaped portion in such a manner as to be radially outwardly spaced apart by a predetermined interval from said second cylindrical suspended portion, so as to form an upper outer annular groove in cooperation with said second cylindrical suspended portion, and an engaging portion formed on an inner peripheral surface of said cylindrical engaging suspended portion, and wherein said lower casing has an annular engaging projection formed integrally on an outer peripheral edge of said lower annular flat plate-shaped portion in such a manner as to be radially outwardly spaced apart by a predetermined interval from an outer peripheral surface of said second annular projection, so as to form a lower outer annular groove in cooperation with said second annular projection and the upper surface of said lower annular flat plate-shaped portion, and an engaged portion formed on the outer peripheral surface of said annular engaging projection, said first annular projection being formed integrally on the upper surface of said lower annular flat plate-shaped portion in such a manner as to be radially outwardly spaced apart by from the insertion hole of said lower annular flat plate-shaped portion via an annular shoulder portion, said second annular projection being formed integrally on the upper surface of said lower annular flat plate-shaped portion in such a manner as to be radially outwardly spaced apart by a predetermined interval from said first annular projection, so as to form the lower annular recess in cooperation with said first annular projection and the upper surface of said lower annular flat plate-shaped portion, said upper casing being combined with said lower casing by radially superposing said first cylindrical suspended portion on said first annular projection, by disposing said second cylindrical suspended portion in the lower outer annular groove so as to be radially superposed on each of said second annular projection and said annular engaging projection, and by causing said engaging portion to be resiliently fitted to said engaged portion.

18. The synthetic resin-made thrust sliding bearing according to claim 12, wherein said upper annular flat plate-shaped portion has a circular hole in a central portion thereof, and said lower annular flat plate-shaped portion has in a central portion thereof an insertion hole communicating with the circular hole of said upper annular flat plate-shaped portion, wherein said upper casing has a first cylindrical suspended portion formed integrally on the lower surface of said upper annular flat plate-shaped portion via the circular hole of said upper annular flat plate-shaped portion and an annular shoulder portion, a second cylindrical suspended portion formed integrally on the lower surface of said upper annular flat plate-shaped portion in such a manner as to be radially outwardly spaced apart by a predetermined interval from an outer peripheral surface of said first cylindrical suspended portion, so as to form an upper annular recess in cooperation with said first cylindrical suspended portion and the lower surface of said upper annular flat plate-shaped portion, a cylindrical engaging suspended portion formed integrally on an outer peripheral edge of said upper annular flat plate-shaped portion in such a manner as to be radially outwardly spaced apart by a predetermined interval from said second cylindrical suspended portion, so as to form an upper outer annular groove in cooperation with said second cylindrical suspended portion, and an engaging portion formed on an inner peripheral surface of said cylindrical engaging suspended portion, and wherein said lower casing has a third annular projection formed integrally on said lower annular flat plate-shaped portion and having an inside diameter identical to that of the insertion hole, an annular engaging projection formed integrally on an outer peripheral edge of said lower annular flat plate-shaped portion in such a manner as to be radially outwardly spaced apart by a predetermined interval from said second annular projection, so as to form a lower outer annular groove in cooperation with said second annular projection, and an engaged portion formed on the outer peripheral surface of said annular engaging projection, said first annular projection being formed integrally on the upper surface of said lower annular flat plate-shaped portion in such a manner as to be radially outwardly spaced apart by a predetermined interval from said third annular projection, so as to form a lower inner annular groove in cooperation with said third annular projection, said second annular projection being formed integrally on the upper surface of said lower annular flat plate-shaped portion in such a manner as to be radially outwardly spaced apart by a predetermined interval from said first annular projection, so as to form the lower annular recess in cooperation with said first annular projection and the upper surface of said lower annular flat plate-shaped portion, said upper casing being combined with said lower casing by disposing said first cylindrical suspended portion in the lower inner annular groove so as to be radially superposed on said first annular projection and said third annular projection, respectively, by disposing an end portion of said second cylindrical suspended portion in the lower outer annular groove so as to be radially superposed on said second annular projection and said annular engaging projection, respectively, and by causing said engaging portion to be resiliently fitted to said engaged portion.

19. The synthetic resin-made thrust sliding bearing according to claim 18, wherein an inner peripheral surface of said thrust bearing piece defining the circular hole in a central portion thereof has a diameter larger than an outside diameter of said first annular projection, and an outer peripheral surface of said thrust bearing piece has an outside diameter smaller than an inside diameter of said second annular projection, and wherein said thrust bearing piece is disposed in the lower annular recess with annular clearances provided respectively between the inner peripheral surface defining the circular hole and an outer peripheral surface of said first annular projection and between that outer peripheral surface and an inner peripheral surface of said second annular projection, the silicone grease being filled and held in each of the annular clearances, the lower inner annular groove, and the lower outer annular groove.

20. The synthetic resin-made thrust sliding bearing according to claim 12, wherein said upper annular flat plate-shaped portion has a circular hole in a central portion thereof, and said lower annular flat plate-shaped portion has in a central portion thereof an insertion hole communicating with the circular hole of said upper annular flat plate-shaped portion, wherein said upper casing has a first cylindrical suspended portion formed integrally on the lower surface of said upper annular flat plate-shaped portion and having an inside diameter identical to that of the circular hole, a second cylindrical suspended portion formed integrally on the lower surface of said upper annular flat plate-shaped portion in such a manner as to be radially outwardly spaced apart by a predetermined interval from said first cylindrical suspended portion, so as to form an upper inner annular groove in cooperation with said first cylindrical suspended portion, a third cylindrical suspended portion formed integrally on the lower surface of said upper annular flat plate-shaped portion in such a manner as to be radially outwardly spaced apart by a predetermined interval from said second cylindrical suspended portion, so as to form an upper annular recess in cooperation with said second cylindrical suspended portion and the lower surface of said upper annular flat plate-shaped portion, a cylindrical engaging suspended portion formed integrally on an outer peripheral edge of said upper annular flat plate-shaped portion in such a manner as to be radially outwardly spaced apart by a predetermined interval from said third cylindrical suspended portion, so as to form an upper outer annular groove in cooperation with said third cylindrical suspended portion, and an engaging portion formed on an inner peripheral surface of said cylindrical engaging suspended portion, and wherein said lower casing has a third annular projection formed integrally on the upper surface of said lower annular flat plate-shaped portion in such a manner as to be radially outwardly spaced apart by from the insertion hole via an annular shoulder portion, an annular engaging projection formed integrally on an outer peripheral edge of said lower annular flat plate-shaped portion in such a manner as to be radially outwardly spaced apart by a predetermined interval from said second annular projection, so as to form a lower outer annular groove in cooperation with said second annular projection, and an engaged portion formed on the outer peripheral surface of said annular engaging projection, said first annular projection being formed integrally on the upper surface of said lower annular flat plate-shaped portion in such a manner as to be radially outwardly spaced apart by a predetermined interval from said third annular projection, so as to form a lower inner annular groove in cooperation with said third annular projection, said second annular projection being formed integrally on the upper surface of said lower annular flat plate-shaped portion in such a manner as to be radially outwardly spaced apart by a predetermined interval from said first annular projection, so as to form the lower annular recess in cooperation with said first annular projection and the upper surface of said lower annular flat plate-shaped portion, said upper casing being combined with said lower casing by causing said first cylindrical suspended portion to face said annular shoulder portion of said lower casing so as to be radially superposed on an end portion of said third annular projection, by disposing said second cylindrical suspended portion in the lower inner annular groove so as to be radially superposed on said first annular projection and said third annular projection, respectively, by disposing said third cylindrical suspended portion in the lower outer annular groove so as to be radially superposed on said second annular projection and said annular engaging projection, respectively, and by causing said engaging portion to be resiliently fitted to said engaged portion.

21. The synthetic resin-made thrust sliding bearing according to claim 12, wherein said thrust bearing piece has on each of the upper and lower surfaces thereof an annular groove which surrounds the circular hole and a plurality of radial grooves each having one end open at the annular groove and another end open at the outer peripheral surface, said plurality of radial grooves being arranged in a circumferential direction.

22. The synthetic resin-made thrust sliding bearing according to claim 12, wherein said lower casing has a cylindrical portion formed integrally on the lower surface of said lower annular flat plate-shaped portion and having an inside diameter identical to that of the insertion hole.

* * * * *